(12) United States Patent
Dou et al.

(10) Patent No.: US 12,382,422 B2
(45) Date of Patent: Aug. 5, 2025

(54) POSITIONING METHOD, DEVICE AND SYSTEM FOR RECEIVING DEVICE, STORAGE MEDIUM, AND ELECTRONIC DEVICE

(71) Applicant: ZTE Corporation, Shenzhen (CN)

(72) Inventors: Jianwu Dou, Shenzhen (CN); Min Fang, Shenzhen (CN); Yijian Chen, Shenzhen (CN); Nan Zhang, Shenzhen (CN); Lin Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 327 days.

(21) Appl. No.: 18/013,590

(22) PCT Filed: May 12, 2021

(86) PCT No.: PCT/CN2021/093458
§ 371 (c)(1),
(2) Date: Dec. 29, 2022

(87) PCT Pub. No.: WO2022/001401
PCT Pub. Date: Jan. 6, 2022

(65) Prior Publication Data
US 2023/0292277 A1    Sep. 14, 2023

(30) Foreign Application Priority Data

Jun. 30, 2020 (CN) .......................... 202010617374.3

(51) Int. Cl.
*H04W 64/00* (2009.01)
*G01S 7/03* (2006.01)
*G01S 13/87* (2006.01)

(52) U.S. Cl.
CPC .............. *H04W 64/00* (2013.01); *G01S 7/03* (2013.01); *G01S 13/876* (2013.01)

(58) Field of Classification Search
CPC ..... H04W 64/00; H04W 4/026; H04W 4/021; H04W 16/28; H04W 4/02; G01S 7/03;
(Continued)

(56) References Cited

U.S. PATENT DOCUMENTS

| 8,649,742 B2* | 2/2014 | Maruyama | ............. H01Q 15/08 |
| | | | 455/106 |
| 2015/0378104 A1 | 12/2015 | Takahashi | |
| 2019/0219686 A1* | 7/2019 | Shan | ........................ H04B 1/69 |

FOREIGN PATENT DOCUMENTS

| CN | 111050277 A | 4/2020 |
| CN | 111181615 A | 5/2020 |

(Continued)

OTHER PUBLICATIONS

International Search Report for corresponding application PCT/CN2021/093458 filed May 12, 2021; Mail date Aug. 10, 2021.
(Continued)

*Primary Examiner* — Kabir A Timory
(74) *Attorney, Agent, or Firm* — CANTOR COLBURN LLP

(57) ABSTRACT

A positioning method includes: transmitting, by a transmitting device, a pilot signal to an electromagnetic reflecting surface; transmitting, by the transmitting device, control information to an electromagnetic reflecting surface control unit, where the control information includes temporal information and control direction information, the control information is used for instructing the electromagnetic reflecting surface control unit to orient, in target time periods, reflected beams formed by target pilot signals on the electromagnetic reflecting surface towards preset directions, and the preset directions are directions indicated by multiple pieces of preset direction information corresponding to respective ones of the target time periods; and determining, by the transmitting device or the receiving device, signal measure-
(Continued)

ment results corresponding to the preset directions, and positioning, by the transmitting device or the receiving device, the receiving device according to the preset directions and the signal measurement results.

20 Claims, 12 Drawing Sheets

(58) Field of Classification Search
CPC .. G01S 13/876; G01S 7/024; G01S 2013/464; G01S 13/426; G01S 13/46; G01S 13/89; G01S 13/48; H04B 7/04013; H04B 7/15528; H04L 5/0048; H04L 5/0053; H04L 5/0091

See application file for complete search history.

(56) References Cited

FOREIGN PATENT DOCUMENTS

| | | | |
|---|---|---|---|
| CN | 111245492 | A | 6/2020 |
| CN | 111245494 | A | 6/2020 |
| CN | 111866726 | A | 10/2020 |
| JP | 2018144505 | A | 9/2018 |
| JP | 2019531483 | A | 10/2019 |
| WO | 2006030832 | A1 | 3/2006 |

OTHER PUBLICATIONS

Japanese Office Action for Japanese Patent Application No. 2022 to 580533; Dated Feb. 28, 2025.

* cited by examiner x-coordinate x of target area
Unit: meter

Y-coordinate y of target area
Unit: meter

POSITIONING METHOD, DEVICE AND SYSTEM FOR RECEIVING DEVICE, STORAGE MEDIUM, AND ELECTRONIC DEVICE

CROSS REFERENCE

This application is a National Stage Filing of the PCT International Application No. PCT/CN2021/093458 filed on May 12, 2021, which claims priority to Chinese patent application No. 202010617374.3 filed on Jun. 30, 2020, the entirety of which is herein incorporated by reference.

TECHNICAL FIELD

Embodiments of the present disclosure relate to the field of communication, in particular to a positioning method, device and system for a receiving device, a storage medium, and an electronic device.

BACKGROUND

Traditional estimation methods for a direction of arrival (DOA) of an array beam include methods based on multiple signal classification (MUSIC), estimating signal parameter via rotation invariance techniques (ESPRIT), etc., a foundation of which lies in an independent measurement function (for example, an arrival phase measurement function) of an array element. However, for intelligent electromagnetic reflecting surfaces (also known as intelligent reflecting surfaces or electromagnetic reflecting surfaces), such a measurement function will reduce reflection efficiency and increase cost. Thus, the intelligent reflecting surfaces are not usually associated with a phase measurement function of an independent electromagnetic unit, and accordingly, the traditional estimation methods for a DOA of an array are not applicable to the intelligent reflecting surfaces.

Traditional non-line-of-sight positioning methods include a line-of-sight reconstruction positioning method, a non-line-of-sight weighted positioning method, a time of arrival (TOA) positioning method based on a combination of line-of-sight reconstruction and smoothing, and a positioning method based on inequality constraints. In these methods, non line of sight is converted into line of sight according to a mirror principle, or influences of non-line-of-sight components are reduced through stochastic methods by the coordination between multiple base stations. In addition, in a fingerprint map or a positioning method based on a global positioning system in the related art, deployment of another positioning system and related accessories are required, which causes increase in cost and limitation to implementation in some scenes. It can be seen that in the related art, the use of multiple systems and the support from other related technologies are required during positioning, and a terminal cannot be positioned by means of characteristics of an electromagnetic reflecting surface.

For the technical problem that in the related art, a terminal cannot be positioned by means of characteristics of an electromagnetic reflecting surface, no effective technical solution is available so far.

SUMMARY

Embodiments of the present disclosure provide a positioning method, device and system for a receiving device, a storage medium, and an electronic device, which can at least solve the technical problem that in the related art, a terminal may not be positioned by means of characteristics of an electromagnetic reflecting surface.

According to an embodiment of the present disclosure, a positioning method for a receiving device includes: transmitting, by a transmitting device, a pilot signal to an electromagnetic reflecting surface; transmitting, by the transmitting device, control information to an electromagnetic reflecting surface control unit, where the control information includes temporal information and control direction information, the control information is used for instructing the electromagnetic reflecting surface control unit to orient, in target time periods, reflected beams formed by target pilot signals on the electromagnetic reflecting surface towards preset directions, the preset directions are directions indicated by multiple pieces of preset direction information corresponding to respective ones of the target time periods, the preset directions point to a target area, the temporal information includes the target time periods, the control direction information includes the preset direction information, and the pilot signal transmitted by the transmitting device includes the target pilot signals; and determining, by the transmitting device or the receiving device, signal measurement results corresponding to the preset directions, and positioning, by the transmitting device or the receiving device, the receiving device according to the preset directions and the signal measurement results, where the signal measurement results are the ones obtained by measuring, by the receiving device located in the target area, the received target pilot signals reflected in the preset directions.

In an exemplary embodiment, before transmitting, by the transmitting device, the pilot signal to the electromagnetic reflecting surface, the method further includes: determining, by the transmitting device, the control information according to the target area. The operation of determining the control information according to the target area includes: determining the multiple pieces of preset direction information according to multiple sub-areas obtained by dividing the target area, and determining the temporal information according to the multiple pieces of preset direction information, where the multiple pieces of preset direction information are in one-to-one correspondence with the multiple sub-areas, the temporal information includes the multiple target time periods, and the multiple target time periods are in one-to-one correspondence with the multiple pieces of preset direction information; or determining multiple preset directions pointing to the target area, determining each piece of preset direction information as one of the multiple preset directions, and determining the temporal information according to the multiple pieces of preset direction information, where the temporal information includes the multiple target time periods, and the multiple target time periods are in one-to-one correspondence with the multiple pieces of preset direction information.

In an exemplary embodiment, after transmitting, by the transmitting device, the control information to the electromagnetic reflecting surface control unit, the method further includes: determining, by the electromagnetic reflecting surface control unit, target reflection coefficients according to the multiple pieces of preset direction information; and adjusting, by the electromagnetic reflecting surface control unit, reflection coefficients of respective electromagnetic units of the electromagnetic reflecting surface to the target reflection coefficients, so as to form the reflected beams in the preset directions by the electromagnetic reflecting surface. The reflection coefficient of each electromagnetic unit includes at least one of amplitude, phase and polarization.

In an exemplary embodiment, in a case where the multiple pieces of preset direction information are respectively target reflection coefficients, corresponding to the preset directions, of respective electromagnetic units, after transmitting, by the transmitting device, the control information to the electromagnetic reflecting surface control unit, the method further includes: adjusting, by the electromagnetic reflecting surface control unit, reflection coefficients of respective electromagnetic units of the electromagnetic reflecting surface to the target reflection coefficients, so as to form the reflected beams in the preset directions by the electromagnetic reflecting surface. The reflection coefficient of each electromagnetic unit includes at least one of amplitude, phase and polarization.

In an exemplary embodiment, in a case where the multiple pieces of preset direction information are respectively input parameters corresponding to the preset directions, after transmitting, by the transmitting device, the control information to the electromagnetic reflecting surface control unit, the method further includes: determining, by the electromagnetic reflecting surface control unit, target reflection coefficients according to the input parameters, and adjusting, by the electromagnetic reflecting surface control unit, reflection coefficients of respective electromagnetic units of the electromagnetic reflecting surface to the target reflection coefficients, so as to form the reflected beams in the preset directions by the electromagnetic reflecting surface. The input parameters are used for determining the target reflection coefficients, and the reflection coefficient of each electromagnetic unit includes at least one of amplitude, phase and polarization.

In an exemplary embodiment, the control information further includes one of: beam control start time for instructing the electromagnetic reflecting surface control unit to start controlling respective electromagnetic units of the electromagnetic reflecting surface at the beam control start time, so as to control directions of the reflected beams on the electromagnetic reflecting surface; or beam control end time for instructing the electromagnetic reflecting surface control unit to end up controlling respective electromagnetic units of the electromagnetic reflecting surface at the beam control end time.

In an exemplary embodiment, in a case of determining, by the transmitting device, the signal measurement results corresponding to the preset directions, and positioning, by the transmitting device, the receiving device according to the preset directions and the signal measurement results, before determining, by the transmitting device, the signal measurement results corresponding to the preset directions, the method further includes: receiving, by the transmitting device, a measurement result set transmitted by the receiving device. The measurement result set includes the signal measurement results corresponding to the target time periods. The operation of determining, by the transmitting device, the signal measurement results corresponding to the preset directions includes: determining, according to the target time periods, the preset directions indicated by the multiple pieces of preset direction information corresponding to the respective ones of target time periods, and determining the signal measurement results corresponding to the target time periods as the signal measurement results corresponding to the preset directions.

In an exemplary embodiment, in a case of determining, by the receiving device, the signal measurement results corresponding to the preset directions, and positioning, by the receiving device, the receiving device according to the preset directions and the signal measurement results, before determining, by the receiving device, the signal measurement results corresponding to the preset directions, the method further includes: receiving, by the receiving device, corresponding relation information transmitted by the transmitting device. The corresponding relation information indicates a corresponding relation between the preset directions and the target time periods, or the corresponding relation information indicates a corresponding relation between the preset directions and the target pilot signals. The operation of determining, by the receiving device, the signal measurement results corresponding to the preset directions includes: determining, in a case where the corresponding relation information indicates the corresponding relation between the preset directions and the target time periods, signal measurement results corresponding to the target time periods as the signal measurement results corresponding to the preset directions; or determining, in a case where the corresponding relation information indicates the corresponding relation between the preset directions and the target pilot signals, signal measurement results corresponding to the target pilot signals as the signal measurement results corresponding to the preset directions.

In an exemplary embodiment, positioning the receiving device according to the preset directions and the signal measurement results includes: determining, according to the preset directions and a position and height of the electromagnetic reflecting surface, position coordinates $(x_i, y_i)$ of the reflected beam corresponding to each preset direction in the target area, and determining a value of the signal measurement result corresponding to the preset direction as a z-coordinate $z_i$ corresponding to the position coordinates $(x_i, y_i)$, where $i$ is an identifier of the reflected beam corresponding to the preset direction; and carrying out Gaussian function fitting according to a coordinate range of the target area, the position coordinates $(x_i, y_i)$ and the corresponding z-coordinate $z_i$ to obtain a fitted Gaussian function, and determining, according to coordinates corresponding to a vertex of the fitted Gaussian function, a positioning result of positioning the receiving device.

In an exemplary embodiment, carrying out Gaussian function fitting according to the coordinate range of the target area, the position coordinates $(x_i, y_i)$ and the corresponding z-coordinate $z_i$ to obtain the fitted Gaussian function, and determining, according to the coordinates corresponding to the vertex of the fitted Gaussian function, the positioning result of positioning the receiving device include: sampling, at a preset coordinate interval, an x-coordinate range and a y-coordinate range of the target area respectively to obtain an x-coordinate set and a y-coordinate set after sampling; determining a z-coordinate $z_w$ corresponding to each x-coordinate $x_w$ in the x-coordinate set from the z-coordinate $z_i$ corresponding to the position coordinates $(x_i, y_i)$, and determining a z-coordinate $z_p$ corresponding to each y-coordinate $y_p$ in the y-coordinate set from the z-coordinate $z_i$ corresponding to the position coordinates $(x_i, y_i)$, where $w$ and $p$ are positive integers in an interval $[1,n]$, and $n$ is the number of samples sampled; carrying out one-dimensional Gaussian function fitting according to a coordinate set $(x_w, z_w)$ composed of the x-coordinate set and the z-coordinate $z_w$ corresponding to each x-coordinate $x_w$ in the x-coordinate set to obtain a first fitted Gaussian function; carrying out one-dimensional Gaussian curve fitting according to a coordinate set $(y_p, z_p)$ composed of the y-coordinate set and the z-coordinate $z_p$ corresponding to each y-coordinate $y_p$ in the y-coordinate set to obtain a second fitted Gaussian function; and determining a first coordinate $x_t$ corresponding to a vertex of the first Gaussian function and a second coordinate yt corresponding to a vertex of the second Gaussian function, and determining xt and yt as an x-coordinate and a y-coordinate of the positioning result respectively, where the xt is an x-coordinate within the x-coordinate range, and the yt is a y-coordinate within the y-coordinate range.

In an exemplary embodiment, positioning the receiving device according to the preset directions and the signal measurement results includes: determining, according to the preset directions and a position and height of the electromagnetic reflecting surface, position coordinates (xi, yi) of the reflected beam corresponding to each preset direction in the target area, and determining a value of the signal measurement result corresponding to the preset direction as a z-coordinate zi corresponding to the position coordinates (xi, yi), where i is an identifier of the reflected beam corresponding to the preset direction; carrying out two-dimensional Gaussian function fitting according to a coordinate set (xi, yi, zi) composed of the position coordinates (xi, yi) and the z-coordinate zi to obtain a fitted two-dimensional Gaussian function; and determining coordinates (xt, yt) corresponding to a vertex of the two-dimensional Gaussian function, and determining the coordinates (xt, yt) as a positioning result of positioning the receiving device, where xt is an x-coordinate within an x-coordinate range of the target area, and yt is a y-coordinate within a y-coordinate range of the target area.

In an exemplary embodiment, after determining, by the transmitting device, the signal measurement results corresponding to the preset directions, and positioning, by the transmitting device, the receiving device according to the preset directions and the signal measurement results, the method further includes: determining, by the transmitting device, target direction information according to a positioning result of positioning the receiving device. The target direction information is used for instructing the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals transmitted by the transmitting device towards the receiving device.

In an exemplary embodiment, after determining, by the receiving device, the signal measurement results corresponding to the preset directions, and positioning, by the receiving device, the receiving device according to the preset directions and the signal measurement results, the method further includes: determining, by the receiving device, target direction information according to a positioning result of positioning the receiving device. The target direction information is used for instructing the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals transmitted by the transmitting device towards the receiving device.

Another embodiment of the present disclosure provides a positioning device for a receiving device. The positioning device includes: a transmitting module, configured to transmit, through a transmitting device, a pilot signal to an electromagnetic reflecting surface; a control module, configured to transmit, through the transmitting device, control information to an electromagnetic reflecting surface control unit, where the control information includes temporal information and control direction information, the control information is used for instructing the electromagnetic reflecting surface control unit to orient, in target time periods, reflected beams formed by target pilot signals on the electromagnetic reflecting surface towards preset directions, the preset directions are directions indicated by multiple pieces of preset direction information corresponding to respective ones of the target time periods, the preset directions point to a target area, the temporal information includes the target time periods, the control direction information includes the preset direction information, and the pilot signal transmitted by the transmitting device includes the target pilot signals; and a positioning module, configured to determine, through the transmitting device or the receiving device, signal measurement results corresponding to the preset directions, and position, through the transmitting device or the receiving device, the receiving device according to the preset directions and the signal measurement results, where the signal measurement results are the ones obtained by measuring, by the receiving device located in the target area, the received target pilot signals reflected in the preset directions.

Yet another embodiment of the present disclosure provides a positioning system for a receiving device. The positioning system includes: a transmitting device, an electromagnetic reflecting surface control unit, an electromagnetic reflecting surface and a receiving device. The transmitting device is configured to transmit a pilot signal to the electromagnetic reflecting surface and is configured to transmit control information to the electromagnetic reflecting surface control unit. The control information includes temporal information and control direction information, the control information is used for instructing the electromagnetic reflecting surface control unit to orient, in target time periods, reflected beams formed by target pilot signals on the electromagnetic reflecting surface towards preset directions, the preset directions are directions indicated by multiple pieces of preset direction information corresponding to respective ones of the target time periods, and the preset directions point to a target area. The temporal information includes the target time periods, the control direction information includes the preset direction information, and the pilot signal transmitted by the transmitting device includes the target pilot signals. The electromagnetic reflecting surface control unit is configured to orient, in the target time periods according to the control information, the reflected beams formed by the target pilot signals on the electromagnetic reflecting surface towards the preset directions. The receiving device is configured to measure the received target pilot signals reflected in the preset directions to obtain signal measurement results. The receiving device is located in the target area. The transmitting device or the receiving device is further configured to determine the signal measurement results corresponding to the preset directions, and position the receiving device according to the preset directions and the signal measurement results corresponding to the preset directions.

Yet another embodiment of the present disclosure provides a computer-readable storage medium storing a computer program, and the computer program is configured to execute the operations in an embodiment of any of the above methods at runtime.

Yet another embodiment of the present disclosure provides an electronic device including a memory and a processor, the memory stores a computer program, and the processor is configured to run the computer program so as to execute the operations in an embodiment of any of the above methods.

DETAILED DESCRIPTION

Embodiments of the present disclosure will be described in detail below with reference to the accompanying drawings in conjunction with the embodiments.

It should be noted that the terms "first", "second", etc., in the description and claims of the present disclosure and in the above accompanying drawings, are used to distinguish between similar objects and not necessarily to describe a particular order or sequential order.

Figure 1:
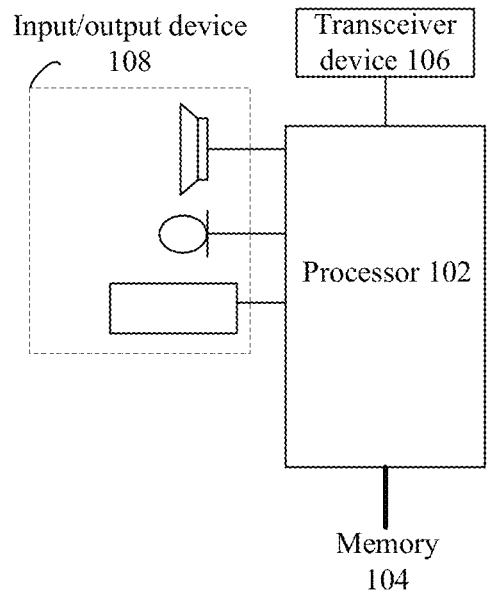
FIG. 1 is a structural block diagram of hardware of an electronic device for a positioning method for a receiving device in an embodiment of the present disclosure.

A method embodiment provided in an embodiment of the present disclosure may be executed in a mobile terminal, a computer terminal or a similar computing device. Taking the method embodiment miming on an electronic device as an example, FIG. 1 is a structural block diagram of hardware of an electronic device for a positioning method for a receiving device in an embodiment of the present disclosure. As shown in FIG. 1, the electronic device may include one or more (only one is shown in FIG. 1) processors 102 (the processor 102 may include, but is not limited to, a micro controller unit (MCU) or a field programmable gate array (FPGA) and other processing devices) and a memory 104 configured to store data. The above electronic device may further include a transceiver device 106 with a communication function and an input/output device 108. Those having ordinary skill in the art can understand that a structure shown in FIG. 1 is merely schematic and does not pose a limitation on a structure of the above electronic device. For example, the electronic device may further include assemblies more or fewer than those shown in FIG. 1, or have a configuration different from that shown in FIG. 1.

The memory 104 may be configured to store a computer program such as a software program and module of an application, for example, a computer program corresponding to a positioning method for a receiving device in an embodiment of the present disclosure, and the processor 102 executes various functional applications and data processing by running the computer program stored in the memory 104, that is, achieves the above method. The memory 104 may include a high-speed random access memory, and may further include a non-volatile memory, for example, one or more magnetic storage devices, flash memories, or other non-volatile solid-state memories. In some examples, the memory 104 may further include a memory remotely arranged with respect to the processor 102, and the remote memory may be connected with the electronic device by means of a network. Examples of the above network include, but are not limited to, the internet, enterprise intranets, local area networks, mobile communication networks, and combinations thereof.

The transceiver device 106 is configured to receive or transmit data by means of a network. Specific examples of the above network may include a wireless network provided by a communication provider. In one example, the transceiver device 106 includes a network interface controller (NIC), which may be connected with other network devices so as to be in communication with the internet. In one example, the transceiver device 106 may be a radio frequency (RF) module, which is configured to be in communication with the internet in a wireless manner.

Figure 2:
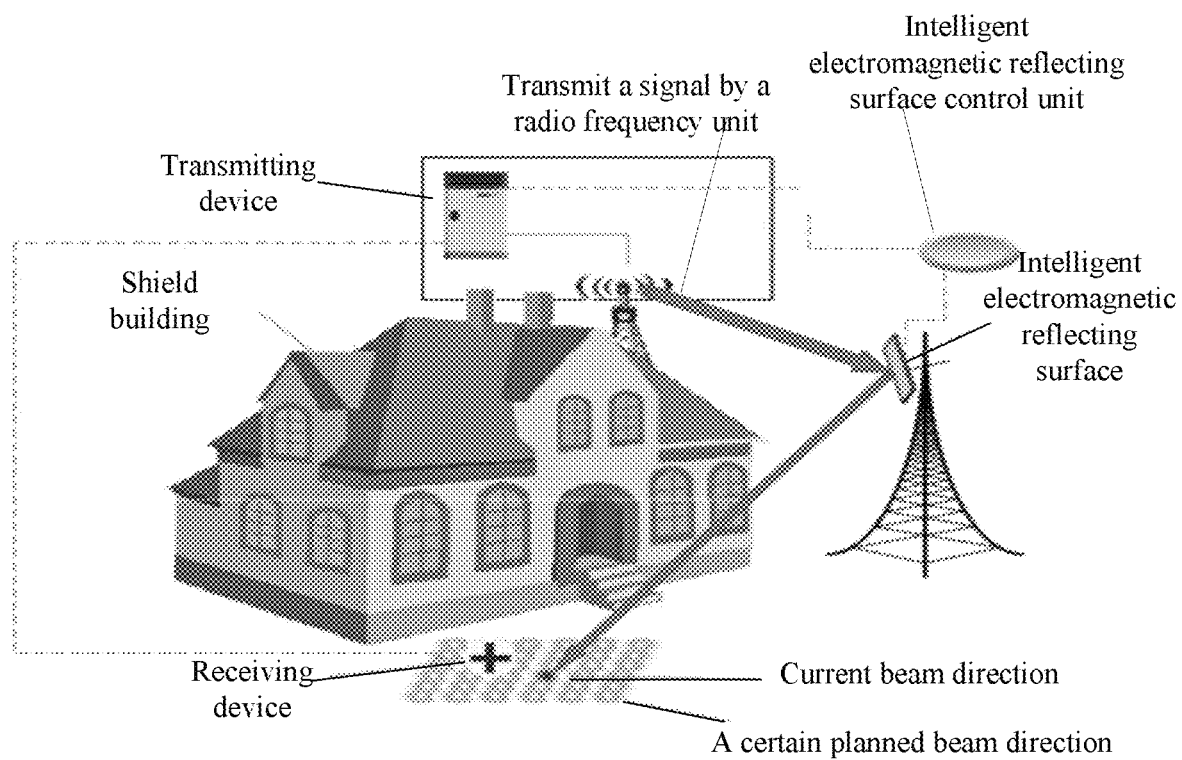
FIG. 2 is a network architecture diagram of a positioning method for a receiving device in an embodiment of the present disclosure.

An embodiment of the present disclosure may run on a network architecture shown in FIG. 2. As shown in FIG. 2, the network architecture includes: a transmitting device (for example, a base station), an intelligent electromagnetic reflecting surface control unit (which corresponds to the electromagnetic reflecting surface control unit in the embodiments of the present disclosure), an intelligent electromagnetic reflecting surface (that is, the electromagnetic reflecting surface in the embodiment of the present disclosure) and a receiving device (for example, a terminal). The transmitting device includes a radio frequency unit or an antenna, and is configured to plan, configure and transmit a specific radio signal. For example, the transmitting device transmits a radio frequency signal (such as a pilot signal in the embodiment of the present disclosure) to an intelligent electromagnetic reflecting surface by the radio frequency unit. The intelligent electromagnetic reflecting surface control unit is configured to control reflection coefficients of respective electromagnetic units (or referred to as electromagnetic reflecting units) of the intelligent reflecting surface. The intelligent electromagnetic reflecting surface is composed of multiple electromagnetic units having controllable reflection coefficients, and a predetermined reflected beam antenna directional diagram may be formed on the intelligent electromagnetic reflecting surface (that is, reflected beams in predetermined directions may be formed on the intelligent reflecting surface) by controlling the reflection coefficients of the electromagnetic units. The receiving device is configured to receive radio signals and measure, record or analyze the received radio signals. Target pilot signals transmitted by the transmitting device are planned and configured by the transmitting device (for example, a base station) in advance, and the transmitting device notifies the receiving device about the planned target pilot signals, thereby enabling the receiving device to know the target pilot signals to be transmitted by the transmitting device.

Figure 3:
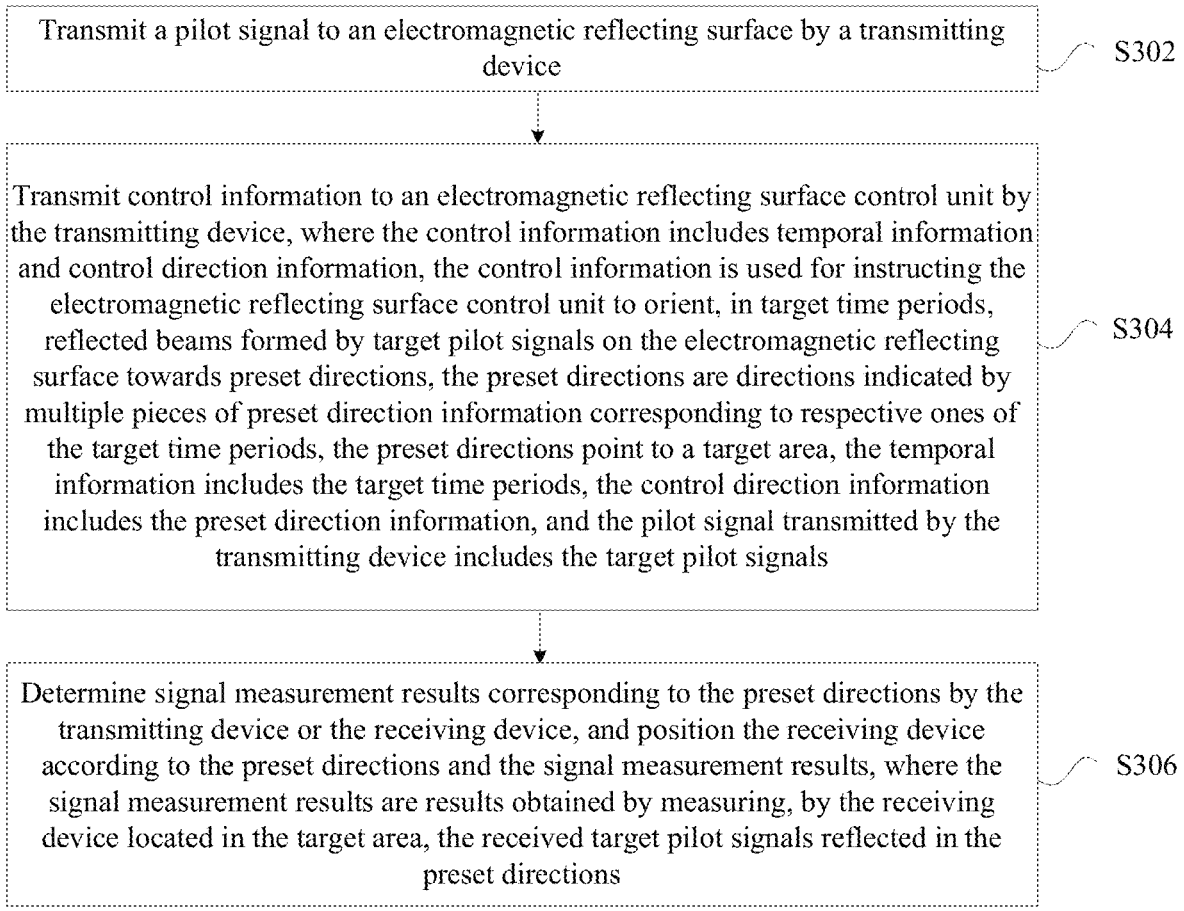
FIG. 3 is a flow diagram of a positioning method for a receiving device in an embodiment of the present disclosure.

The embodiment provides a positioning method for a receiving device running in the above network architecture. FIG. 3 is a flow diagram of a positioning method for a receiving device in an embodiment of the present disclosure. As shown in FIG. 3, this flow includes operations S302 to S306 which are described in detail below.

At operation S302, a transmitting device transmits a pilot signal to an electromagnetic reflecting surface.

At operation S304, the transmitting device transmits control information to an electromagnetic reflecting surface control unit, where the control information includes temporal information and control direction information, the control information is used for instructing the electromagnetic reflecting surface control unit to orient, in target time periods, reflected beams formed by target pilot signals on the electromagnetic reflecting surface towards preset directions, the preset directions are directions indicated by multiple pieces of preset direction information corresponding to respective ones of the target time periods, the preset directions point to a target area, the temporal information includes the target time periods, the control direction information includes the preset direction information, and the pilot signal transmitted by the transmitting device includes the target pilot signals.

At operation S306, the transmitting device or the receiving device determines signal measurement results corresponding to the preset directions, and positions the receiving device according to the preset directions and the signal measurement results, where the signal measurement results are the ones obtained by measuring, by the receiving device located in the target area, the received target pilot signals reflected in the preset.

Through the above operations, the transmitting device transmits the pilot signal to the electromagnetic reflecting surface; the transmitting device transmits the control information to the electromagnetic reflecting surface control unit, where the control information includes the temporal information and the control direction information, the control information is used for instructing the electromagnetic reflecting surface control unit to orient, in the target time periods, the reflected beams formed by the target pilot signals on the electromagnetic reflecting surface towards the preset directions, the preset directions are the directions indicated by multiple pieces of preset direction information corresponding to the respective ones of target time periods, the preset directions point to the target area, the temporal information includes the target time periods, the control direction information includes the preset direction information, and the pilot signal transmitted by the transmitting device includes the target pilot signals; and the transmitting device or the receiving device determines the signal measurement results corresponding to the preset directions, and positions the receiving device according to the preset directions and the signal measurement results, where the signal measurement results are the results obtained by measuring, by the receiving device located in the target area, the received target pilot signals reflected in the preset directions. Therefore, the technical problem that in the related art, a terminal may not be positioned by means of characteristics of an electromagnetic reflecting surface may be solved, and the effect of positioning a terminal by means of characteristics of an electromagnetic reflecting surface is achieved.

It should be noted that in the embodiment of the present disclosure, a set of system is used (that is, a base station and an electromagnetic reflecting surface are used), and the receiving device may be positioned by means of the capability of the electromagnetic reflecting surface such that the receiving device may be positioned by means of a base station and characteristics of an electromagnetic reflecting surface.

In the above embodiment, each signal measurement result may be signal quality, signal field strength level, or signal receiving power.

An execution sequence of the operation S302 and the operation S304 may be interchanged, that is, the operation S304 may be executed first, and then the operation S302 is executed.

In an exemplary embodiment, before the transmitting device transmits the pilot signal to the electromagnetic reflecting surface, the method further includes: the transmitting device determines the control information according to the target area. The operation of determining the control information according to the target area includes: determining the multiple pieces of preset direction information according to multiple sub-areas obtained by dividing the target area, and determining the temporal information according to the multiple pieces of preset direction information, where the multiple pieces of preset direction information are in one-to-one correspondence with the multiple sub-areas, the temporal information includes the multiple target time periods, and the multiple target time periods are in one-to-one correspondence with the multiple pieces of preset direction information; or determining multiple preset directions pointing to the target area, determining each piece of preset direction information as one of the multiple preset directions, and determining the temporal information according to the multiple pieces of preset direction information, where the temporal information includes the multiple target time periods, and the multiple target time periods are in one-to-one correspondence with the multiple pieces of preset direction information.

In the above embodiment, the transmitting device may divide the target area into multiple sub-areas, for example, divide the target area into a sub-area 1, a sub-area 2, a sub-area 3, etc. The preset direction information, such as preset direction information 1, preset direction information 2, preset direction information 3, etc., in one-to-one correspondence with the sub-areas is determined according to the sub-areas obtained through division. The preset direction information is used for instructing the electromagnetic reflecting surface control unit to adjust reflection coefficients of respective electromagnetic units of the electromagnetic reflecting surface, so as to orient the reflected beams formed on the electromagnetic reflecting surface towards the sub-area corresponding to the preset direction information, such that the reflected beams sequentially point to respective sub-areas of the target area by controlling the electromagnetic reflecting surface, thereby scanning the target area by the transmitting device. In an exemplary embodiment, the transmitting device may determine the preset direction information corresponding to respective sub-areas according to a scanning sequence of the sub-areas of the target area, and determine the temporal information according to the determined preset direction information (that is, determine multiple target time periods, where each of the target time periods has corresponding preset direction information). For example, the determined multiple pieces of preset direction information are preset direction information 1, preset direction information 2 and preset direction information 3, and the temporal information includes a target time period 1, a target time period 2 and a target time period 3, where the target time period 1 corresponds to preset direction information 1, the target time period 2 corresponds to preset direction information 2, and the target time period 3 corresponds to the preset direction information 3.

In the above embodiment, the transmitting device may directly determine multiple preset directions in the target area, for example, in the target area, determine a first preset direction pointing to a certain position in the target area and determine a second preset direction pointing to another position in the target area, that is, determine multiple preset directions, and determine each piece of preset direction information as one of the multiple preset directions, that is, take one preset direction as one piece of preset direction information. After the multiple pieces of preset direction information are determined, the transmitting device may determine, according to a scanning sequence of positions in the target area, the target time period corresponding to the scanning sequence. For example, the temporal information includes a target time period 1 and a target time period 2, where the target time period 1 corresponds to the preset direction information 1, and the target time period 2 corresponds to the preset direction information 2.

It should be noted that in the embodiments of the present disclosure, the target time periods may be time periods corresponding to time slot numbers (that is, time slot sequence numbers), and the temporal information may be a set composed of time periods corresponding to the time slot numbers (that is, time periods corresponding to the time slots corresponding to the time slot numbers), in other words, the temporal information includes time periods corresponding to multiple time slots sequentially arranged. Moreover, the control direction information includes multiple pieces of preset direction information, where each of the target time periods in the temporal information is in one-to-one correspondence with each piece of preset direction information in the control direction information. Therefore, in the embodiments of the present disclosure, by transmitting the control information to the electromagnetic reflecting surface control unit, the electromagnetic reflecting surface control unit is instructed to orient, in a target time period, the reflected beam formed by a target pilot signal on the electromagnetic reflecting surface towards a preset direction indicated by the preset direction information corresponding to the target time period; and when a next target time period arrives (for example, start time of the next target time period arrives), the electromagnetic reflecting surface control unit orients the reflected beam formed by the target pilot signal on the electromagnetic reflecting surface towards the preset direction indicated by the preset direction information corresponding to the next target time period. Therefore, the electromagnetic reflecting surface control unit controls, in a certain target time period in the temporal information, the reflected beam on the electromagnetic reflecting surface to point to the corresponding direction, where the corresponding direction is a direction indicated by the preset direction information corresponding to this certain target time period.

In an exemplary embodiment, after the transmitting device transmits the control information to the electromagnetic reflecting surface control unit, the method further includes the following operations: the electromagnetic reflecting surface control unit determines target reflection coefficients according to the preset direction information; and the electromagnetic reflecting surface control unit adjusts reflection coefficients of respective electromagnetic units of the electromagnetic reflecting surface to the target reflection coefficients, so as to form the reflected beams in the preset directions by the electromagnetic reflecting surface. The reflection coefficient of each electromagnetic unit includes at least one of amplitude, phase and polarization.

In an exemplary embodiment, in a case where the multiple pieces of preset direction information are respectively target reflection coefficients, corresponding to the preset directions, of respective electromagnetic units, after the transmitting device transmits the control information to the electromagnetic reflecting surface control unit, the method further includes: the electromagnetic reflecting surface control unit adjusts reflection coefficients of respective electromagnetic units of the electromagnetic reflecting surface to the target reflection coefficients, so as to form the reflected beams in the preset directions by the electromagnetic reflecting surface. The reflection coefficient of each electromagnetic unit includes at least one of amplitude, phase and polarization.

In an exemplary embodiment, in a case where the multiple pieces of preset direction information are respectively input parameters corresponding to the preset directions, after the transmitting device transmits the control information to the electromagnetic reflecting surface control unit, the method further includes: the electromagnetic reflecting surface control unit determines target reflection coefficients according to the input parameters, and adjusts reflection coefficients of respective electromagnetic units of the electromagnetic reflecting surface to the target reflection coefficients, so as to form the reflected beams in the preset directions by the electromagnetic reflecting surface. The input parameters are used for determining the target reflection coefficients, and the reflection coefficient of each electromagnetic unit includes at least one of amplitude, phase and polarization.

In an exemplary embodiment, the control information further includes one of: beam control start time for instructing the electromagnetic reflecting surface control unit to start controlling respective electromagnetic units of the electromagnetic reflecting surface at the beam control start time, so as to control directions of the reflected beams on the electromagnetic reflecting surface; or beam control end time for instructing the electromagnetic reflecting surface control unit to end up controlling respective electromagnetic units of the electromagnetic reflecting surface at the beam control end time.

The electromagnetic reflecting surface control unit is further configured to adjust, at the beam control start time according to a first target time period in the temporal information, a reflection coefficient of the electromagnetic reflecting surface to a target reflection coefficient corresponding to a first preset direction, where the first preset direction is a direction indicated by the preset direction information corresponding to the first target time period.

In an exemplary embodiment, the respective target time periods in the temporal information constitute a continuous time period, start time of the first target time period in the temporal information is the beam control start time, end time of a last target time period is the beam control end time, and end time of each intermediate target time period (that is, a target time period between the first target time period and the last target time period) is start time of a next target time period. For example, the temporal information includes target time period 1 to target time period 3, where end time of the target time period 1 is start time of the target time period 2, end time of the target time period 2 is start time of the target time period 3, start time of the target time period 1 is the beam control start time, and end time of the target time period 3 is the beam control end time.

In an exemplary embodiment, the above temporal information may be a set of time periods corresponding to time slots (for example, a time period corresponding to a 1st time slot to a time period corresponding to a 180th time slot), and the target time period is a time period corresponding to a target temporal sequence number (also known as target time slot, or target time slot number, for example, one of the 1st time slot to the 180th time slot). In an exemplary embodiment, the transmitting device records a corresponding relation between the target time periods and the pilot signals transmitted in the target time periods, and the receiving device records, when receiving the target pilot signals, a corresponding relation between the target time periods and the target pilot signals received in the target time periods. It should be noted that the corresponding relation between the target time periods and the pilot signals transmitted in the target time periods recorded by the transmitting device is consistent with the corresponding relation between the target time periods and the target pilot signals received in the target time periods recorded by the receiving device.

In an exemplary embodiment, in a case that the transmitting device determines the signal measurement results corresponding to the preset directions, and positions the receiving device according to the preset directions and the signal measurement results, before the transmitting device determines the signal measurement results corresponding to the preset directions, the method further includes: the transmitting device receives a measurement result set transmitted by the receiving device. The measurement result set includes the signal measurement results corresponding to the target time periods. The operation that the transmitting device determines the signal measurement results corresponding to the preset directions includes: determining, according to the target time periods, the preset directions indicated by the multiple pieces of preset direction information corresponding to the respective ones of target time periods, and determining the signal measurement results corresponding to the target time periods as the signal measurement results corresponding to the preset directions.

In an exemplary embodiment, in a case where the receiving device determines the signal measurement results corresponding to the preset directions, and positions the receiving device according to the preset directions and the signal measurement results, before the receiving device determines the signal measurement results corresponding to the preset directions, the method further includes: the receiving device receives corresponding relation information transmitted by the transmitting device. The corresponding relation information indicates a corresponding relation between the preset directions and the target time periods, or the corresponding relation information indicates a corresponding relation between the preset directions and the target pilot signals. The operation that the receiving device determines the signal measurement results corresponding to the preset directions includes: determining, in a case where the corresponding relation information indicates the corresponding relation between the preset directions and the target time periods, signal measurement results corresponding to the target time periods as the signal measurement results corresponding to the preset directions; or determining, in a case where the corresponding relation information indicates the corresponding relation between the preset directions and the target pilot signals, signal measurement results corresponding to the target pilot signals as the signal measurement results corresponding to the preset directions.

In the above embodiment, when receiving the target pilot signals reflected in the preset directions, the receiving device records the target time periods corresponding to the target pilot signals (for example, the time period corresponding to the 1st time slot), and measures the target pilot signals to obtain the signal measurement results, where each signal measurement result may be signal quality, signal field strength level or signal receiving power.

In an exemplary embodiment, the operation of positioning the receiving device according to the preset directions and the signal measurement results includes: determining, according to the preset directions and a position and height of the electromagnetic reflecting surface, position coordinates $(x_i, y_i)$ of the reflected beam corresponding to each preset direction in the target area, and determining a value of the signal measurement result corresponding to the preset direction as a z-coordinate $z_i$ corresponding to the position coordinates $(x_i, y_i)$, where i is an identifier of the reflected beam corresponding to the preset direction; and carrying out Gaussian function fitting according to a coordinate range of the target area, the position coordinates $(x_i, y_i)$ and the corresponding z-coordinate $z_i$ to obtain a fitted Gaussian function, and determining, according to coordinates corresponding to a vertex of the fitted Gaussian function, a positioning result of positioning the receiving device.

In an exemplary embodiment, the operation of carrying out the Gaussian function fitting according to the coordinate range of the target area, the position coordinates $(x_i, y_i)$ and the corresponding z-coordinate $z_i$ to obtain the fitted Gaussian function, and determining, according to the coordinates corresponding to the vertex of the fitted Gaussian function, the positioning result of positioning the receiving device include: sampling, at a preset coordinate interval, an x-coordinate range and a y-coordinate range of the target area respectively to obtain an x-coordinate set and a y-coordinate set after sampling; determining a z-coordinate $z_w$ corresponding to each x-coordinate $x_w$ in the x-coordinate set from the z-coordinate $z_i$ corresponding to the position coordinates $(x_i, y_i)$, and determining a z-coordinate $z_p$ corresponding to each y-coordinate $y_p$ in the y-coordinate set from the z-coordinate $z_i$ corresponding to the position coordinates $(x_i, y_i)$, where w and p are positive integers in an interval $[1,n]$, and n is the number of samples sampled; carrying out one-dimensional Gaussian function fitting according to a coordinate set $(x_w, z_w)$ composed of the x-coordinate set and the z-coordinate $z_w$ corresponding to each x-coordinate $x_w$ in the x-coordinate set to obtain a first fitted Gaussian function; carrying out one-dimensional Gaussian curve fitting according to a coordinate set $(y_p, z_p)$ composed of the y-coordinate set and the z-coordinate $z_p$ corresponding to each y-coordinate $y_p$ in the y-coordinate set to obtain a second fitted Gaussian function; and determining a first coordinate $x_t$ corresponding to a vertex of the first Gaussian function and a second coordinate $y_t$ corresponding to a vertex of the second Gaussian function, and determining xt and yt as an x-coordinate and a y-coordinate of the positioning result respectively, where the xt is an x-coordinate within the x-coordinate range, and the yt is a y-coordinate within the y-coordinate range.

For example, the target area is an area of which an x-coordinate is within a range of [xs,xe] and a y-coordinate is within a range of [ys,ye], where xs, xe, ys and ye are all real numbers, xe>xs and ye>ys. Sampling is carried out according to a preset coordinate interval on the x-coordinate range and the y-coordinate range of the target area respectively to obtain a x-coordinate set and a y-coordinate set after sampling, then in the above embodiment, xs≤xw≤xe, ys≤yp≤ye, and in the obtained positioning result, xs≤xt≤xe, and ys≤yt≤ye.

It should be noted that in the above embodiment, by carrying out fitting of two one-dimensional Gaussian functions (that is, carrying out fitting of two one-dimensional Gaussian curves separately), coordinates (that is, input corresponding to maximums of the Gaussian functions) corresponding to vertices (that is, maximums of the Gaussian functions, and also maximums of Gaussian curves corresponding to the Gaussian functions) of two one-dimensional Gaussian functions may be determined respectively, so as to determine position coordinates (that is, a positioning result) of the receiving device.

The operations of determining the z-coordinate zw corresponding to each x-coordinate xw in the x-coordinate set from the z-coordinate zi corresponding to the position coordinates (xi, yi), and determining the z-coordinate zp corresponding to each y-coordinate yp in the y-coordinate set from the z-coordinate zi corresponding to the position coordinates (xi, yi) include: determining y-coordinates corresponding to all position coordinates with x-coordinate of xw from the position coordinates (xi, yi), and determining a maximum of the y-coordinates corresponding to all the position coordinates with x-coordinate of xw as a z-coordinate zw corresponding to the x-coordinate xw; and determining y-coordinates corresponding to all position coordinates with y-coordinate of yp from the position coordinates (xi, yi), and determining a maximum of the y-coordinates corresponding to all the position coordinates with y-coordinate of yp as the z-coordinate zp corresponding to the y-coordinate yp.

It should be noted that in the above embodiment, the position coordinates of the receiving device may be determined by carrying out fitting of two one-dimensional Gaussian functions (that is, carrying out fitting of two one-dimensional Gaussian functions, and each one-dimensional Gaussian function corresponds to one Gaussian curve). The coordinates (that is, input corresponding to the maximums of the Gaussian curves) corresponding to the vertices (that is, the maximums of the Gaussian functions corresponding to the Gaussian curves) of the Gaussian curves are determined respectively, so as to determine the position coordinates of the receiving device.

In an exemplary embodiment, the operation of positioning the receiving device according to the preset directions and the signal measurement results includes: determining, according to the preset directions and a position and height of the electromagnetic reflecting surface, position coordinates (xi, yi) of the reflected beam corresponding to each preset direction in the target area, and determining a value of the signal measurement result corresponding to the preset direction as a z-coordinate zi corresponding to the position coordinates (xi, yi), where i is an identifier of the reflected beam corresponding to the preset direction; carrying out two-dimensional Gaussian function fitting according to a coordinate set (xi, yi, zi) composed of the position coordinates (xi, yi) and the z-coordinate zi to obtain a fitted two-dimensional Gaussian function; and determining coordinates (xt, yt) corresponding to a vertex of the two-dimensional Gaussian function, and determining the coordinates (xt, yt) as a positioning result of positioning the receiving device, where xt is an x-coordinate within an x-coordinate range of the target area, and yt is a y-coordinate within a y-coordinate range of the target area.

For example, the x-coordinate range corresponding to the target area is [xs,xe], and the y-coordinate range corresponding to the target area is [ys,ye], where xs, xe, ys, and ye are all real numbers, xe>xs, ye>ys, then in the obtained positioning result, xs≤xt≤xe, ys≤yt≤ye.

It should be noted that in the above embodiment, the position coordinates of the receiving device may be determined by carrying out two-dimensional Gaussian function fitting (that is, carrying out Gaussian curved surface fitting). Fitting may be achieved through a least square method or minimum mean square error method.

In an exemplary embodiment, after the transmitting device determines the signal measurement results corresponding to the preset directions, and positions the receiving device according to the preset directions and the signal measurement results, the method further includes: the transmitting device determines the target direction information according to a positioning result of positioning the receiving device. The target direction information is used for instructing the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals transmitted by the transmitting device towards the receiving device.

After the target direction information is determined, the transmitting device transmits the target direction information to the electromagnetic reflecting surface control unit, so as to instruct the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals towards the receiving device.

In an exemplary embodiment, after the receiving device determines the signal measurement results corresponding to the preset directions, and positions the receiving device according to the preset directions and the signal measurement results, the method further includes: the receiving device determines the target direction information according to a positioning result of positioning the receiving device. The target direction information is used for instructing the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals transmitted by the transmitting device towards the receiving device.

After the target direction information is determined, the receiving device transmits the target direction information to the transmitting device, and the transmitting device transmits the target direction information to the electromagnetic reflecting surface control unit so as to instruct the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals towards the receiving device.

The positioning method for a receiving device in the above embodiments will be explained below in combination with an example, which, however, is not used to limit the technical solution of the embodiments of the present disclosure.

In the related art, it is an extremely effective low-cost method to enhance coverage of a non-direct path area of a mobile network by means of an intelligent super-surface (also known as intelligent electromagnetic reflecting surface, that is, the electromagnetic reflecting surface in the above embodiments). The present disclosure will provides a related method, which may accurately align an azimuth of a target beam by means of characteristics of the intelligent electromagnetic reflecting surface, thereby leading to self-completion of a deployment solution of the intelligent electromagnetic reflecting surface. In addition, a terminal may be accurately positioned in the non-direct path area with coverage enhanced by the intelligent electromagnetic super-surface. That is, in the embodiments of the present disclosure, through deployment of the intelligent electromagnetic reflecting surface, a terminal may be positioned under the situation of a non-direct path by means of a single station (that is, a single base station).

In the embodiments of the present disclosure, the following nodes are mainly involved.

A transmitting device is configured to determine a beam scanning plan, generate pilot sequences (that is, the pilot signal in the above embodiments) based on the beam scanning plan, and transmit the pilot sequences to a radio frequency unit of the transmitting device. The beam scanning plan is determined through a process that the transmitting device carries out grid division or target beam direction plan on the target area, and converts a two-dimensional space domain plan into a one-dimensional time domain plan of the target area. For example, the transmitting device determines, according to a scanning sequence of grids (that is the sub-areas in the above embodiments) in the target area, each grid corresponding to a time sequence (the time sequence is the temporal information in the above embodiments), and determines preset direction information corresponding to each grid. That is, in the above embodiment, each piece of preset direction information has a corresponding target time period. The radio frequency unit of the transmitting device orients a radio frequency beam direction of the transmitting device towards the intelligent electromagnetic reflecting surface through beam control (that is, adjusts the beam to be aligned with the intelligent electromagnetic reflecting surface), and modulates and transmits the received pilot sequences.

It should be noted that in the above embodiment, the pilot sequences transmitted by the transmitting device are code sequences known to both the transmitting device and the receiving device in advance, and the code sequence has desirable autocorrelation and cross-correlation characteristics, and the receiving device may measure radio signal quality or strength based on the pilot sequences. In an exemplary embodiment, the transmitting device transmits specific pilot sequences to the radio frequency unit of the transmitting device within a predetermined time window, and within the time window, contents of the pilot sequences may be the same or different code sequences in a time-sharing manner. Under the situation of using different pilot sequences in a time-sharing manner, the time window is segmented, each segment in the time window corresponds to a distinguishable pilot sequence, and the pilot sequences corresponds to the preset direction information in the control information, that is, the pilot signal are synchronized with and correspond to control azimuths of the target beams (that is, the preset directions in the above embodiments) on the intelligent electromagnetic reflecting surface. The predetermined time window is a time window between the beam control start time and the beam control end time. In an exemplary embodiment, the transmitting device further transmits the beam control start time and the beam control end time to the receiving device.

The transmitting device is further configured to control the intelligent reflecting surface by means of the intelligent electromagnetic reflecting surface control unit, that is, to control directions of the beams on the intelligent reflecting surface, and enable the reflected beams formed on the intelligent reflecting surface to scan the target area;

The operation of controlling the intelligent reflecting surface by means of the intelligent electromagnetic reflecting surface control unit, that is, controlling directions of the beams on the intelligent reflecting surface, includes: the transmitting device transmits the control information to the intelligent reflecting surface control unit by means of an interface between the transmitting device and the intelligent reflecting surface control unit. The control information includes, but is not limited to the following contents: beam control start time, beam control directions, target reflection coefficients of respective electromagnetic units, input parameters for determining target reflection coefficients of respective electromagnetic units, temporal information, beam control end time, etc. The control information may be beam targets obtained through adjustment or control instructions of all the electromagnetic units of the intelligent electromagnetic reflecting surface. When these instructions act on the intelligent electromagnetic units, the reflection coefficients (also known as input reflection coefficients) of the electromagnetic units of the intelligent electromagnetic reflecting surface may be changed or adjusted, such that the main beams reflected on the electromagnetic reflecting surface point to different target azimuths (that is, the preset directions in the above embodiments) according to the predetermined time periods (that is, the target time periods in the temporal information in the above embodiments).

The receiving device measures and records radio signal quality of specific pilots or each pilot in a pilot group in a period of time (that is, the time period between the beam control start time and the beam control end time), that is, the receiving device measures signal quality of all received pilot signals or signal quality of part of all pilot signals based on known pilot sequences or pilot sequence group within the predetermined time window, and records the signal quality and the corresponding target time periods. That is, a signal measurement combination set composed of signal measurement results recorded by the receiving device is radio signal quality arranged according to the time period sequences (that is, the signal measurement result set is time sequence data), and the signal measurement result set corresponds to the beam control time sequences of the intelligent electromagnetic reflecting surface (that is, the time sequence information composed of the target time periods corresponding to all signal measurement results in the signal measurement result set is consistent with the temporal information for controlling the electromagnetic reflecting surface).

The transmitting device or the receiving device is further configured to estimate the target beam directions and position the receiving device based on the measurement results of the receiving device (that is, the signal measurement results in the above embodiments).

The operation of estimating the target beam directions and positioning the receiving device based on the measurement results of the receiving device includes the following operations: (1) determining, based on the measurement results of the receiving device and the beam control time sequences of the intelligent electromagnetic reflecting surface, radio signal quality measured by a terminal when beams mainly controlled on the intelligent electromagnetic reflecting surface point to different azimuths; and (2) estimating a position of the terminal and azimuths of target beams based on radio signal quality in different azimuths of the beams mainly controlled. The operation (2) may be specifically implemented at the receiving device or the transmitting device.

In a case where the operation (2) is achieved at the receiving device, the transmitting device provides the receiving device with the corresponding relation between related beam azimuths and the target time periods, or the corresponding relation between related beam azimuths and the pilot sequences, and the corresponding relation may be transmitted by means of common channels or specific channels. In a case where the operation (2) is achieved at the transmitting device, the receiving device reports related measurement results to the transmitting device such that the transmitting device may obtain a set of beam azimuths of the intelligent electromagnetic reflecting surface and the radio signal quality measured by the terminal, and the radio signal quality may be original measurement results or quantized and coded results.

When the terminal is positioned, the one-dimensional time data may be converted into two-dimensional space data based on directions of beams on the intelligent electromagnetic surface and related measurement results. For example, a position of the terminal may be determined through a two-dimensional curved surface fitting algorithm (that is, two-dimensional Gaussian function fitting is carried out to obtain a fitted two-dimensional Gaussian function, and the two-dimensional Gaussian function corresponds to a Gaussian curved surface). The two-dimensional curved surface fitting algorithm includes, but is not limited to, a two-dimensional Gaussian distribution curved surface method, a least square method, a minimum mean square error method, etc., or fitting of two independent Gaussian curves with dimension reduced to one dimension is carried out (that is, one-dimensional Gaussian function fitting is carried out in an x direction and a y direction separately to obtain two one-dimensional Gaussian functions after fitting, and each one-dimensional Gaussian function corresponds to one Gaussian curve).

Figure 4:
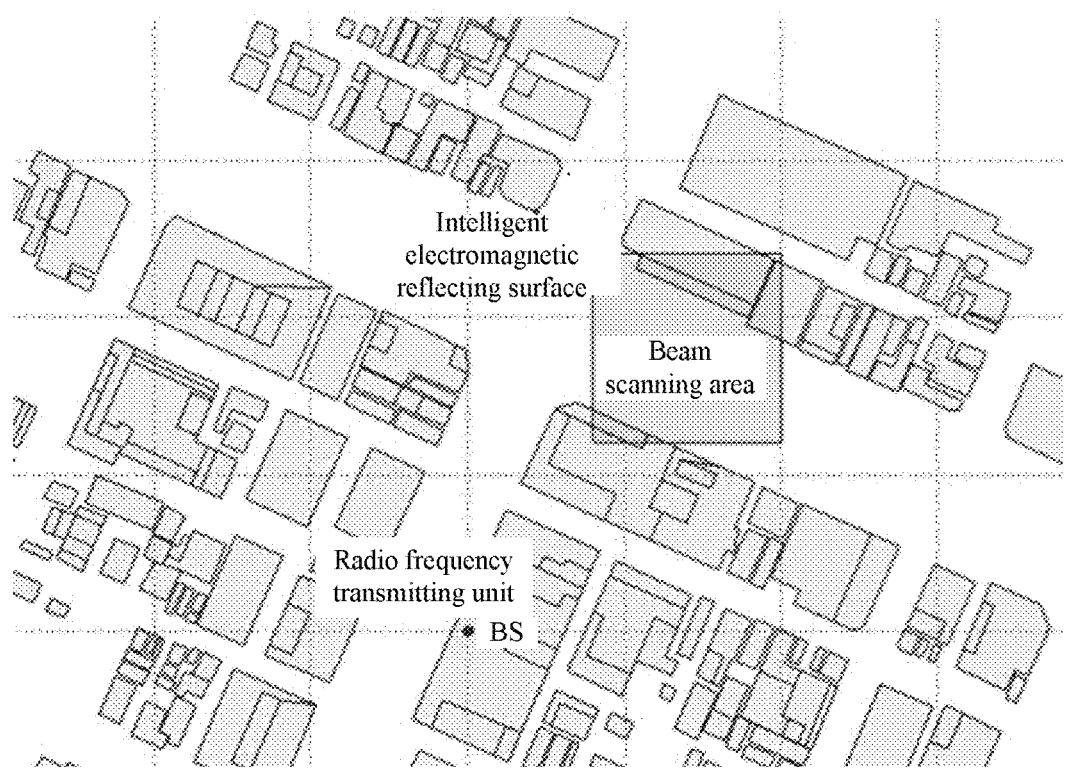
FIG. 4 is a schematic plan view of a deployment scene of an intelligent electromagnetic reflecting surface in an embodiment of the present disclosure.

FIG. 4 is a schematic plan view of a deployment scene of an intelligent electromagnetic reflecting surface in an embodiment of the present disclosure, and shows a beam scanning area (that is, the target area in the above embodiments) and an intelligent electromagnetic reflecting surface (that is, the electromagnetic reflecting surface in the above embodiments). In an exemplary application scene of the present disclosure, the deployment parameters of a transmitting device are as follows:

an antenna (that is, a radio frequency unit) of the transmitting device is installed on a top of a building having a height of 43 m (that is, a height of the antenna of the transmitting device is 43 m);
coordinates of a center of a radio frequency transmitting unit of the transmitting device are: [0, 0, 43] (unit: m);
horizontal azimuth Az=120 degrees;
pitch angle EL=10 degrees; and
rotation angle SL=0 degree.

In the exemplary application scene of the present disclosure, the deployment parameters of the intelligent electromagnetic reflecting surface are as follows:

a position of a center of the intelligent electromagnetic reflecting surface: [21.67, 133.2, 36.2] (unit: m), that is, a position and height of a super-surface in the above embodiment;
horizontal azimuth Az=−60 degrees;
pitch angle EL=0 degrees; and
rotation angle SL=0 degree.

In the exemplary application scene of the present disclosure, the parameters of the transmitting device and the intelligent electromagnetic reflecting surface are configured as follows:

carrier frequency Fc=28 GHz;
polarization: vertical polarization;
equivalent isotropically radiated power (EIRP) of a base station=43 dBm;
size of intelligent electromagnetic reflecting surface: length 20λ×width 20λ, where λ is the wavelength of the carrier;
size of intelligent electromagnetic reflecting surface control unit: length λ/3×width λ/3;
phase control granularity of intelligent electromagnetic reflecting surface: 2-bits (that is, two bits are used to indicate a phase of a super-surface, such that there are four selectable phases: [0, π/2, π, 3π/2] (unit: radian));
sub-carrier space (SCS): 30 kHz;
radio frame length: 10 ms;
the number of time slots per radio frame: 20; and
update frequency of scanning beams set by the transmitting device: per time slot.

When positioning accuracy of the positioning method for a receiving device in an embodiment of the present disclosure is tested, the positioning accuracy of the positioning method in an embodiment of the present disclosure is tested with reference to the receiving device at position coordinates of [68, 88] (unit: m) in the target area.

In an embodiment of the present disclosure, the positioning method includes operations 1 to 5.

At operation 1, a transmitting device determines a beam scanning plan. For example, from a 1st time slot (a time period corresponding to the 1st time slot is a first target time period, and start time of the first target time period corresponds to the beam control start time in the above embodiments) to a 180th time slot (that is, a 180th target time period, which is also a last target time period in the temporal information, and end time of the last target time period corresponds to beam control end time in the above embodiments), beam scanning is carried out in the beam scanning area (that is, the target area in the above embodiments) in FIG. 4, and the transmitting device generates and transmits pilot sequences to a radio frequency unit.

At operation 2, the radio frequency unit of the transmitting device adjusts beams to be aligned with an intelligent electromagnetic reflecting surface, and modulates and then transmits the received pilot sequences.

Figure 5:
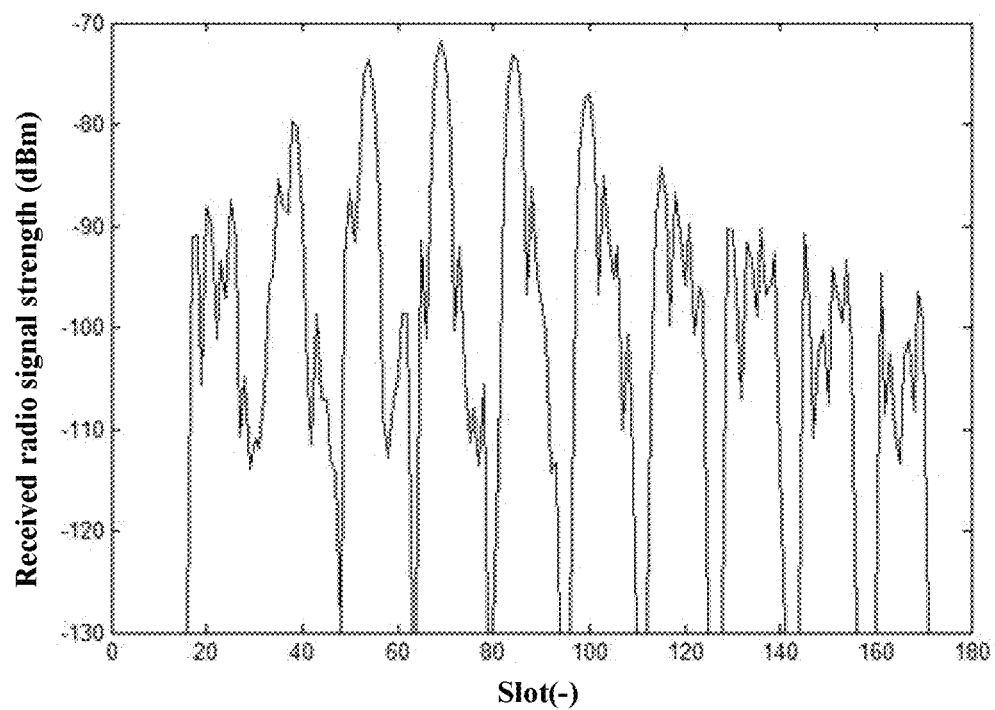
FIG. 5 is a schematic diagram of radio signal quality recorded by a receiving device in an embodiment of the present disclosure.

At operation 3, the transmitting device controls directions of the beams on the intelligent reflecting surface by means of an intelligent electromagnetic reflecting surface control unit, where the beam scanning azimuth on the intelligent electromagnetic reflecting surface is updated per time slot, the reflected beam reaches the beam scanning area in a certain preset direction in a certain time slot, and after each update the beam is aligned to a next new preset direction (that is, the preset direction in the above embodiments). At operation 4, in an exemplary embodiment, the transmitting device transmits the beam control start time and the beam control end time to the receiving device, and the receiving device measures and records radio signal quality of radio pilot signals in this time period (that is, the time period from the beam control start time to the beam control end time), where results are shown in FIG. 5. FIG. 5 shows received signal strength obtained by measuring, by a receiving device, received target pilot signal transmitted by the transmitting device, and an x axis represents time slots sequentially arranged. Since each time slot occupies a certain duration, each time slot may correspond to a time period (that is, the target time period in the above embodiments). For example, a length of each time slot is a (unit: ms), and a kth target time period (that is, a time period corresponding to a kth time slot) in the temporal information is a time period between $t0+(k-1)a$ and $t0+ka$, where $t0$ is the beam control start time (unit: ms), and k is an integer greater than or equal to 1.

At operation 5, target beam directions are estimated based on the received measurement results and the receiving device is positioned based on the received measurement results.

When the receiving device is positioned, in the embodiment, the receiving device reports original measurement results in a measurement period to the transmitting device, and the format of the reported content is: (slotNo represents a time slot number, that is, each of the target time periods in the above embodiment, and RxPwr represents a reception level, that is, a signal measurement result in the above embodiments)

slotNo 1: RxPwr −130;
. . .
slotNo 51: RxPwr −86.5;
slotNo 52: RxPwr −91.61;
slotNo 53: RxPwr −83.66;
slotNo 54: RxPwr −75.13;
slotNo 55: RxPwr −73.55;
slotNo 56: RxPwr −75.06;
slotNo 57: RxPwr −87.31;
. . .

Figure 6:
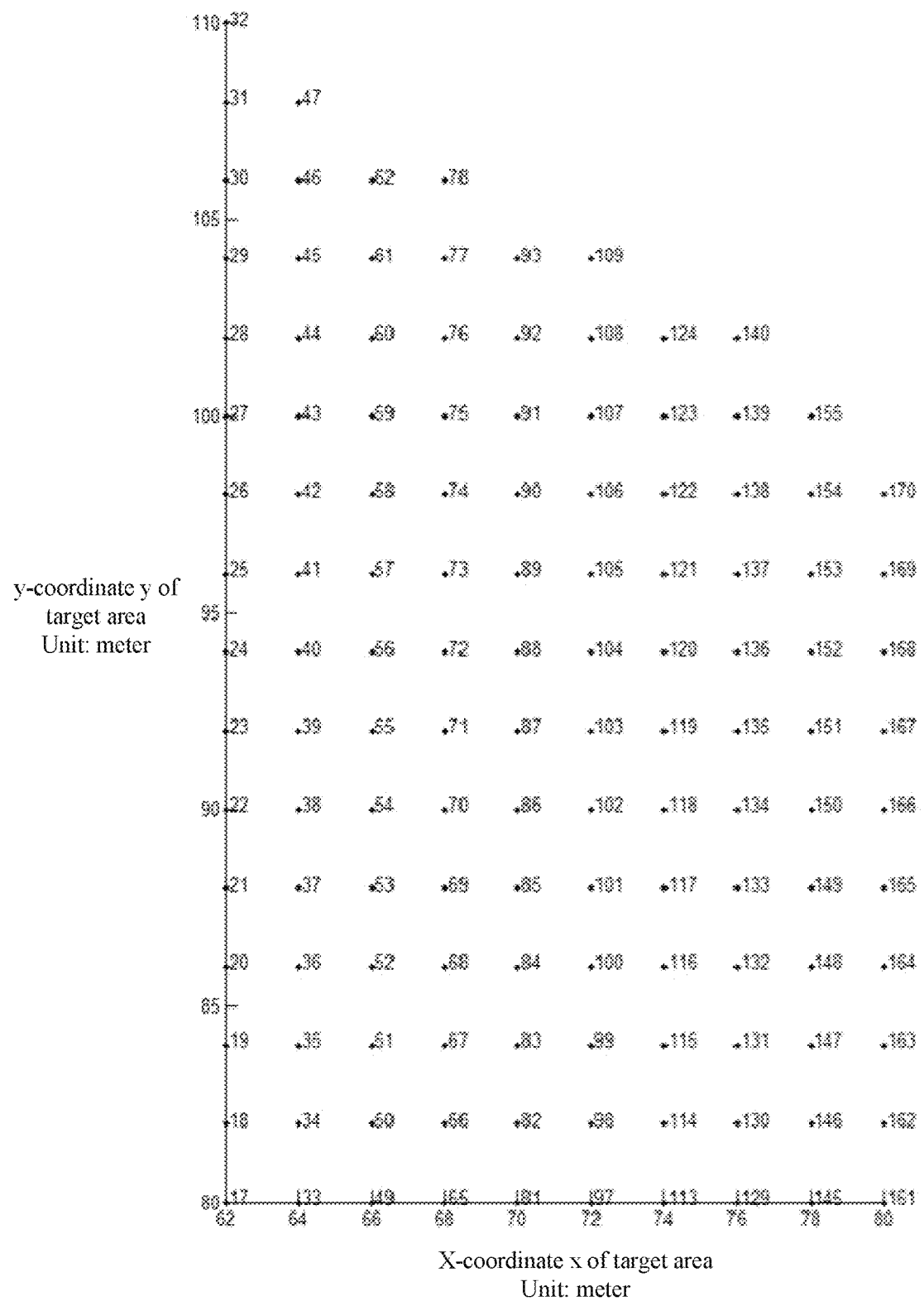
FIG. 6 is a schematic diagram of a corresponding relation between time slots corresponding to radio signal quality and position coordinates in a target area in an embodiment of the present disclosure.
Figure 7:
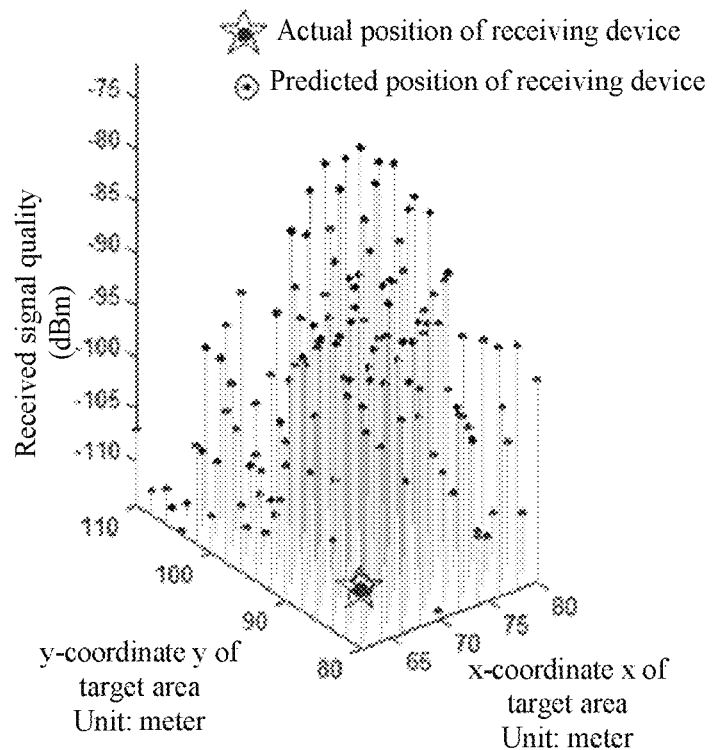
FIG. 7 is a schematic two-dimensional display diagram of radio signal quality and position coordinates in a target area in an embodiment of the present disclosure.
Figure 8:
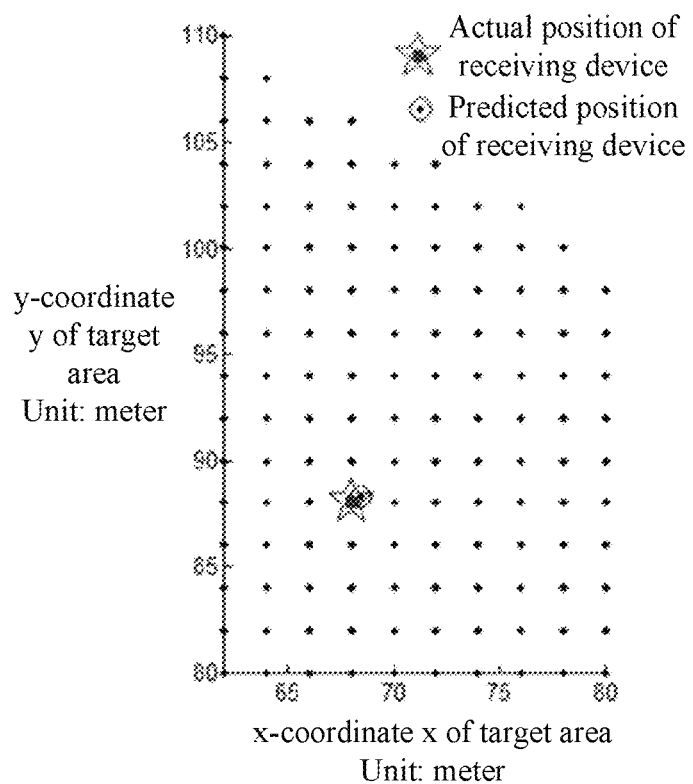
FIG. 8 is a schematic one-dimensional display diagram of radio signal quality and position coordinates in a target area in an embodiment of the present disclosure.

The transmitting device maps the time slot numbers (that is, the corresponding time slots, which are also the target time periods corresponding to the time slots) as the target beam directions, converts one-dimensional time data in FIG. 6 into two-dimensional space data (FIG. 7) in combination with a position and height (that is, the height of the electromagnetic reflecting surface in the above embodiments) of a center of the intelligent electromagnetic reflecting surface, and maps the measurement results to the ground of the beam scanning area, which is shown in FIG. 8 (that is, FIG. 8 is a plan view of FIG. 7). An x axis and a y axis in FIG. 6 represent an x-coordinate of the target area and a y coordinate of the target area respectively, and the number beside each point "·" in FIG. 6 represents a time slot number (the time slot number is further used for representing a time period corresponding to the time slot number). Taking two annotations '·31' and '·47' in the second row in FIG. 6 as an example, "37" and "47" represent that corresponding time slot numbers are 31 and 47 respectively. According to FIG. 6, position coordinates corresponding to each time slot number may be determined. An x axis and a y axis in FIG. 7 represent an x-coordinate of the target area and a y-coordinate of the target area respectively, and a z axis represents received signal quality. An x axis and a y axis in FIG. 8 represent an x-coordinate of the target area and a y-coordinate of the target area respectively, and each dot "·" in FIG. 8 represents the presence of received signal quality, and a specific magnitude of the received signal quality is shown in a z-coordinate in FIG. 7. The annotation "predicted position of receiving device" is a positioning result (that is, coordinates in the positioning result) obtained by positioning the receiving device.

An x-coordinate and a y-coordinate of the receiving device are separately estimated through a dimension reduction method, which is specifically described as follows.

A position [xi, yi] of each beam on the ground is determined based on an azimuth of each beam on the intelligent reflecting surface and a height of the intelligent reflecting surface, where i is a beam identifier, that is, the time slot number in the embodiment.

Dimension reduction is carried out on data in FIGS. 6 and 7 in an x direction and a y direction. This process is specifically described as follows.

(1) Segmentation is carried out in the x-axis direction (that is, to segment x-coordinates), where an interval between segments is 2, and a set composed of coordinates corresponding to centers of all segments is: [62, 64, 66, . . . , 80] (that is, a x-coordinate set in the above embodiments).

(2) Segmentation is carried out in the y-axis direction (that is, to segment y-coordinates), where an interval between segments is 2, and a set composed of coordinates corresponding to centers of all segments is: [80, 82, 84, . . . , 110] (that is, a y-coordinate set in the above embodiments).

(3) For all two-dimensional data, for the set [62, 64, 66, . . . , 80] composed of the coordinates corresponding to the centers of all the X-axis segments, a dimension reduction reception level corresponding to the coordinates of each center is determined (in an exemplary embodiment, the strongest received radio signal quality of each segment is determined as a unique dimension reduction reception level of this segment, that is, for a coordinate xw of a certain center, a maximum (that is, zw) of the received radio signal quality (that is, reception level) corresponding to the coordinate xw is determined), and results are as follows:

[62, RxPwrx1;
64, RxPwrx2;
66, RxPwrx3;
. . . , ;
80, RxPwrx10]

Figure 9:
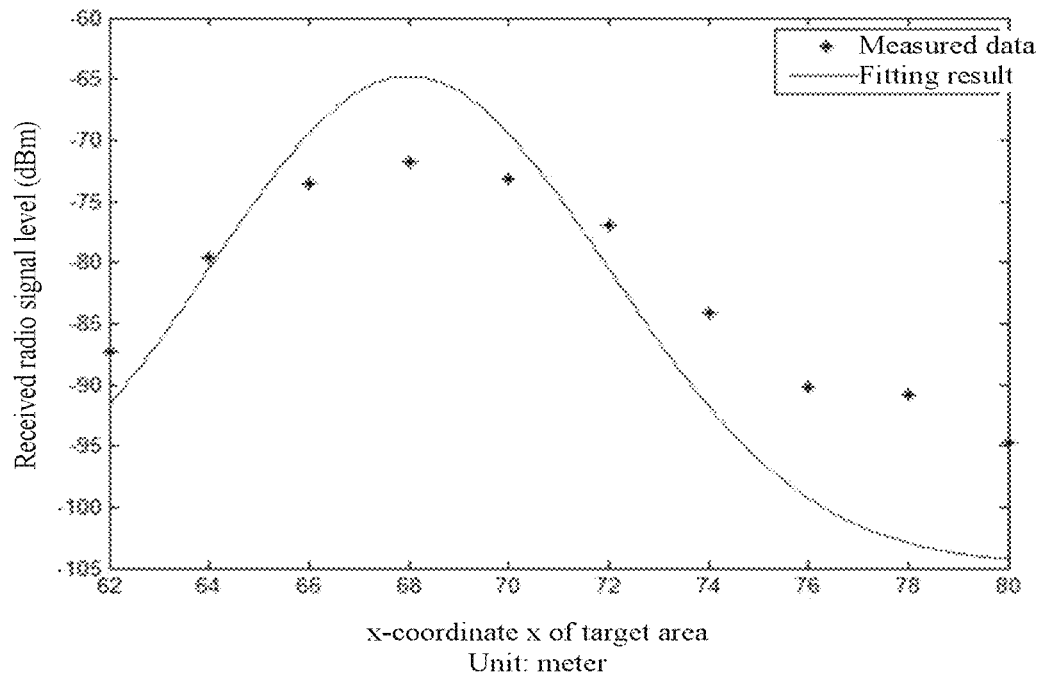
FIG. 9 is a schematic diagram (I) of radio signal quality in an x-axis direction and one-dimensional Gaussian curve fitting in an embodiment of the present disclosure.

The obtained coordinate set in the x-axis direction and the corresponding radio signal quality are measured data shown in FIG. 9.

(4) For all two-dimensional data, the radio signal quality corresponding to respective segments is determined according to a segmentation result in the y direction, where a coordinate set of centers of all the segments of they axis is: [80, 82, 84, . . . , 110], a unique dimension reduction reception level of each segment is determined according to the strongest received radio signal quality in this segment (that is, for each y-coordinate yp in the y-coordinate set, a zp corresponding to the yp is determined, where a specific determination method is similar to the above processing method for an x-axis direction), and results are as follows:

[80, RxPwry1;
82, RxPwry2;
84, RxPwry3;
. . . ,
110, RxPwry16]

Figure 10:
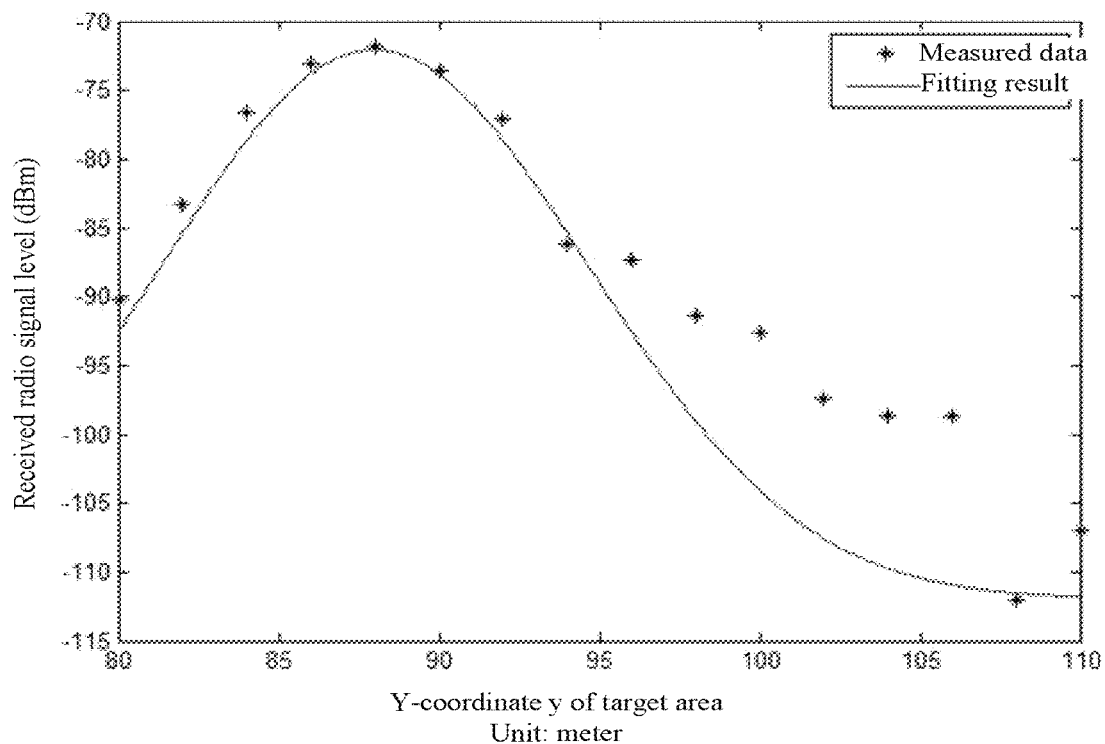
FIG. 10 is a schematic diagram (II) of radio signal quality in a y-axis direction and one-dimensional Gaussian curve fitting in an embodiment of the present disclosure.

The obtained coordinate set in the y-axis direction and the corresponding radio signal quality are measured data shown in FIG. 10.

(5) Positioning results and errors

One-dimensional Gaussian functions are selected as fitting curves, and one-dimensional Gaussian function fitting is carried out in the x direction and the y direction respectively (that is, fitting is carried out respectively to obtain one-dimensional Gaussian functions). In an exemplary embodiment, parameters of the one-dimensional Gaussian function (that is, one-dimensional Gaussian curve, and reference may be made to a fitting result in FIG. 9) corresponding to the x direction, and an x-coordinate (that is, xt in the above embodiments) corresponding to a vertex thereof may be determined through least square fitting respectively. Furthermore, parameters of the one-dimensional Gaussian function corresponding to the y direction (that is, a one-dimensional Gaussian curve, and reference may be made to a fitting result in FIG. 10), and a y-coordinate (that is, yt in the above embodiments) corresponding to a vertex thereof may be determined through least square fitting. According to the positioning method in an embodiment of the present disclosure, the determined position coordinates of the receiving device are: [68.3963, 88.3110] m, a positioning error between same and real coordinates [68, 88] of the receiving device as a reference target is: 0.50378 m. Therefore, through the positioning method provided in an embodiment of the present disclosure, a relatively accurate positioning result may be obtained.

In yet another embodiment of the present disclosure, the receiving device at position coordinates [64, 102] (unit: m) in the target area is also used as a reference to test positioning accuracy of the positioning method in an embodiment of the present disclosure. In an embodiment of the present disclosure, the positioning method includes operations 1 to 8 which are described in detail below.

At operation 1, a transmitting device determines a beam scanning plan: from a 1st time slot to a 180th time slot, beam scanning in a related area in FIG. 4 is carried out, and the transmitting device generates and transmits the pilot sequences to a radio frequency unit.

At operation 2, the radio frequency unit adjusts the beams to be aligned with an intelligent electromagnetic reflecting surface, and modulates and then transmits the received pilot sequences.

At operation 3, the transmitting device controls directions of the beams on the intelligent reflecting surface by means of an intelligent electromagnetic reflecting surface control unit, where beam scanning azimuths are updated per time slot, and the beams after each update are aligned to a next new preset direction.

Figure 11:
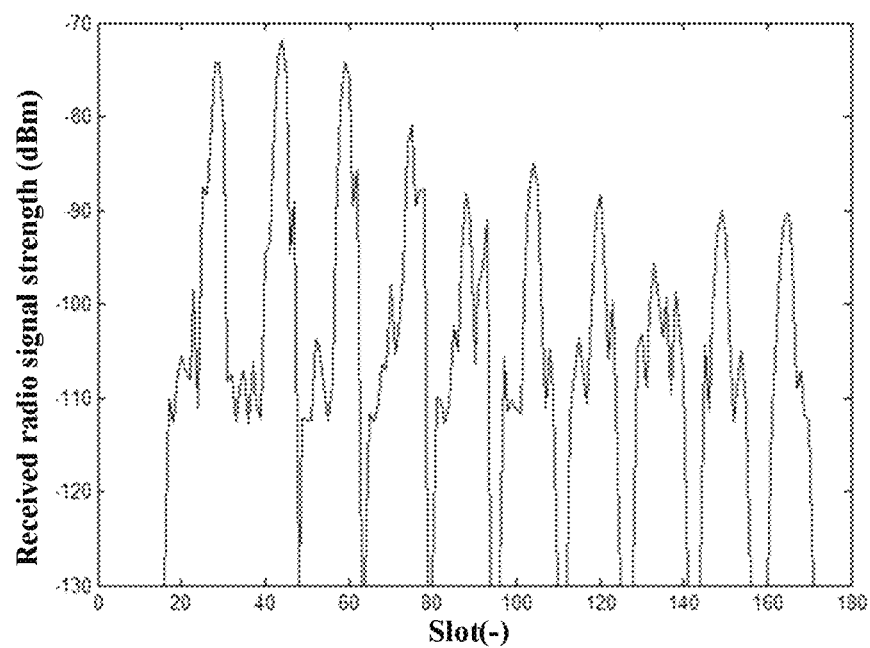
FIG. 11 is a schematic diagram of radio signal quality recorded by a receiving device in another embodiment of the present disclosure.

At operation 4, the receiving device measures and record radios signal quality of a radio pilot signal during this period of time, where a result is shown in FIG. 11.

At operation 5, target beam directions are estimated based on measurement result s of the transmitting device and a terminal is positioned based on measurement result s of the transmitting device.

The receiving device reports original measurement results in one measurement period to the transmitting device, and the format of the reported content is time slot numbers and corresponding signal measurement results (a specific format is the same as the format of the reported content in the above embodiments).

Figure 12:
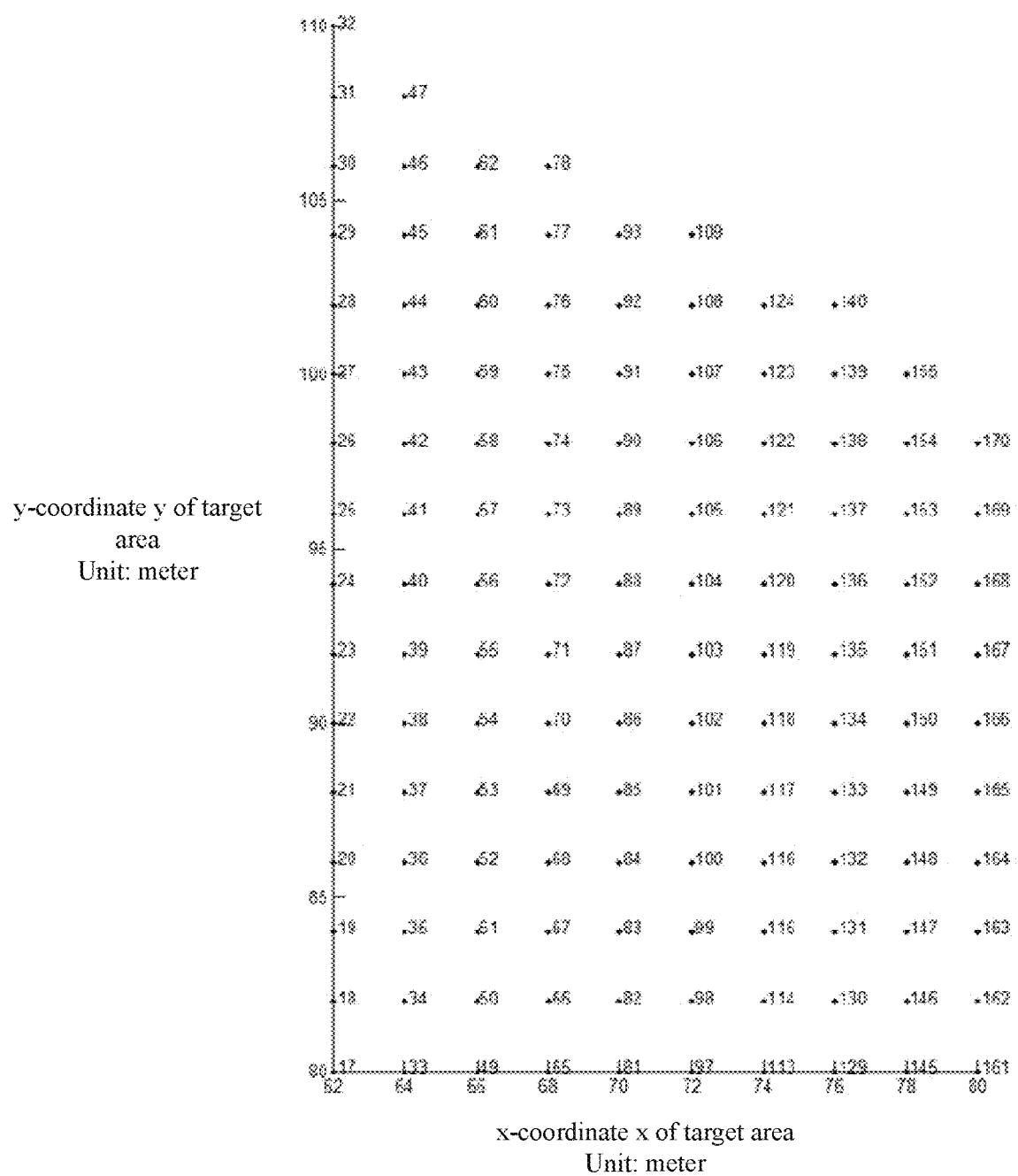
FIG. 12 is a schematic diagram of a corresponding relation between time slots corresponding to radio signal quality and position coordinates in a target area in another embodiment of the present disclosure.
Figure 13:
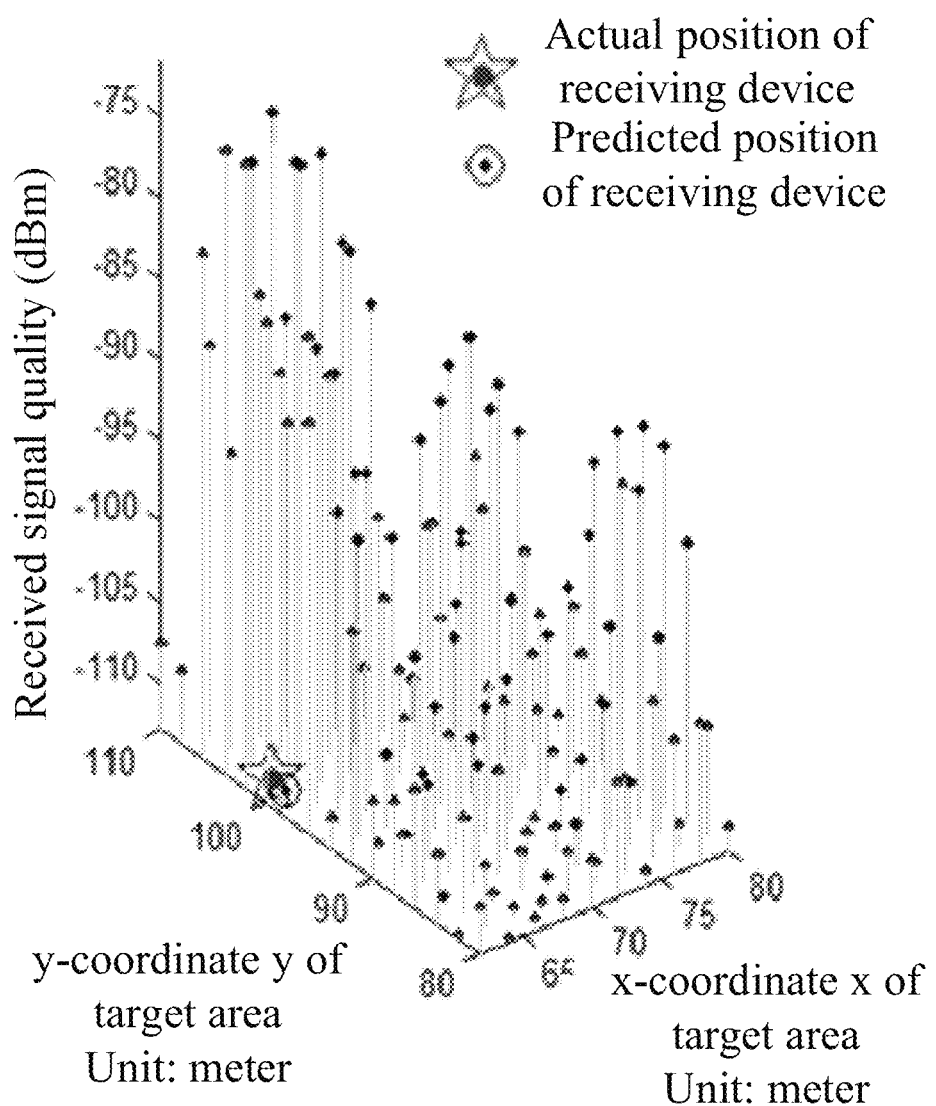
FIG. 13 is schematic two-dimensional display diagram of radio signal quality and position coordinates in a target area in another embodiment of the present disclosure.
Figure 14:
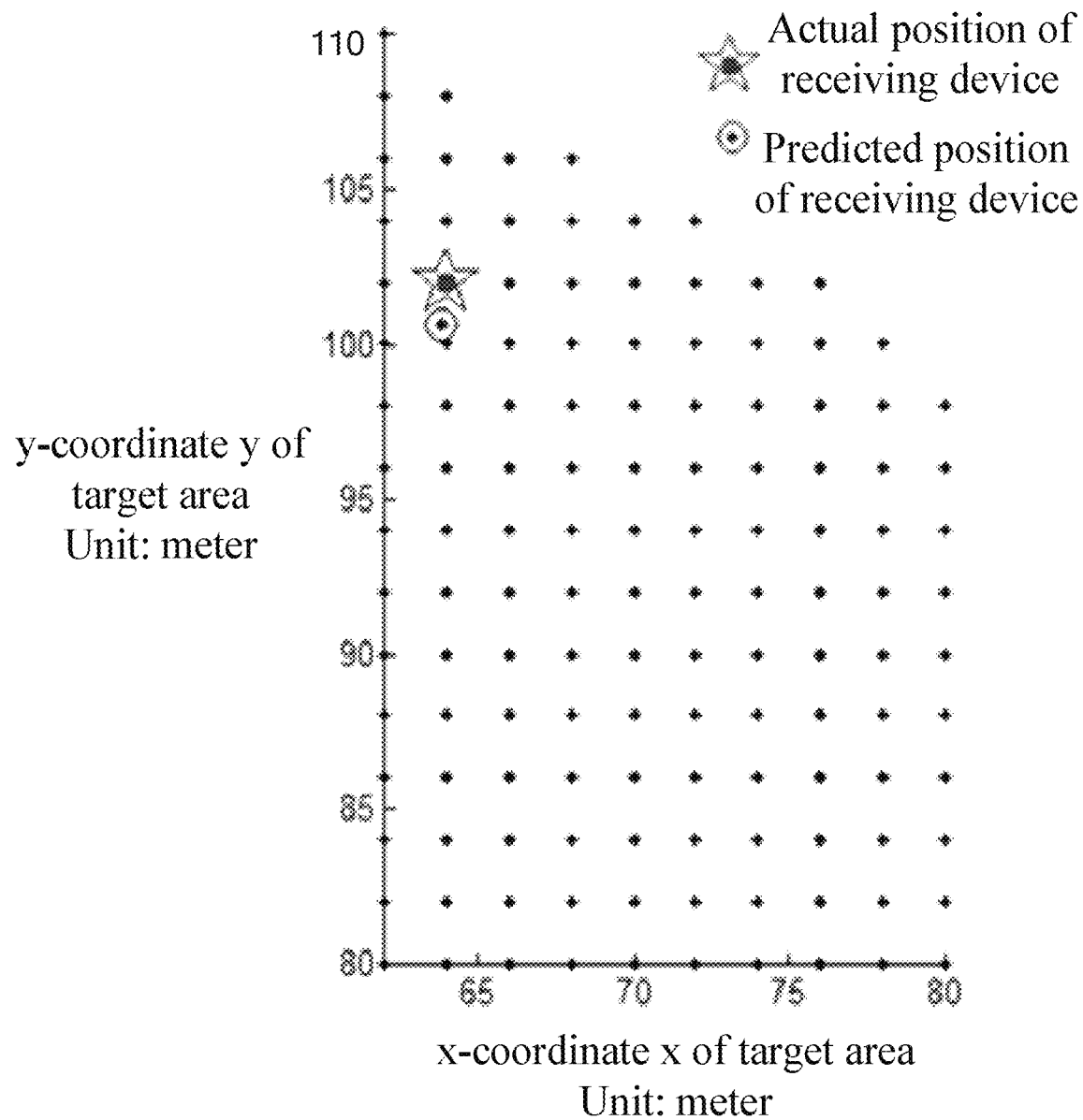
FIG. 14 is a schematic one-dimensional display diagram of radio signal quality and position coordinates in a target area in another embodiment of the present disclosure.

At operation 6, the transmitting device maps the time slot numbers to the target beam directions, and converts one-dimensional time data (that is, radio signal quality corresponding to time slots shown in FIG. 12) into two-dimensional space data shown in FIG. 13 in combination with a position and height of a center of the intelligent electromagnetic reflecting surface, and maps measurement results to the ground of a beam scanning area (that is, obtains a plan view (that is, FIG. 14) corresponding to FIG. 13).

Figure 15:
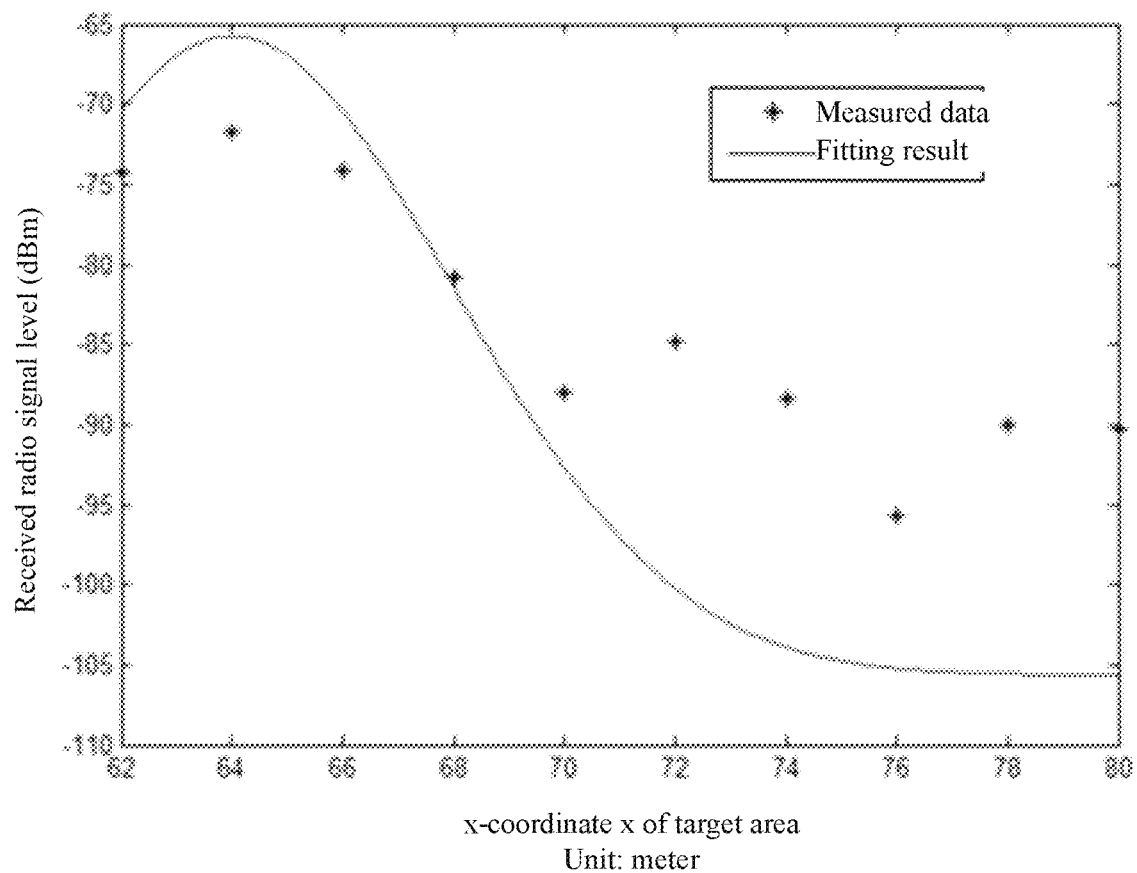
FIG. 15 is a schematic diagram (I) of radio signal quality in an x-axis direction and one-dimensional Gaussian curve fitting in another embodiment of the present disclosure.
Figure 16:
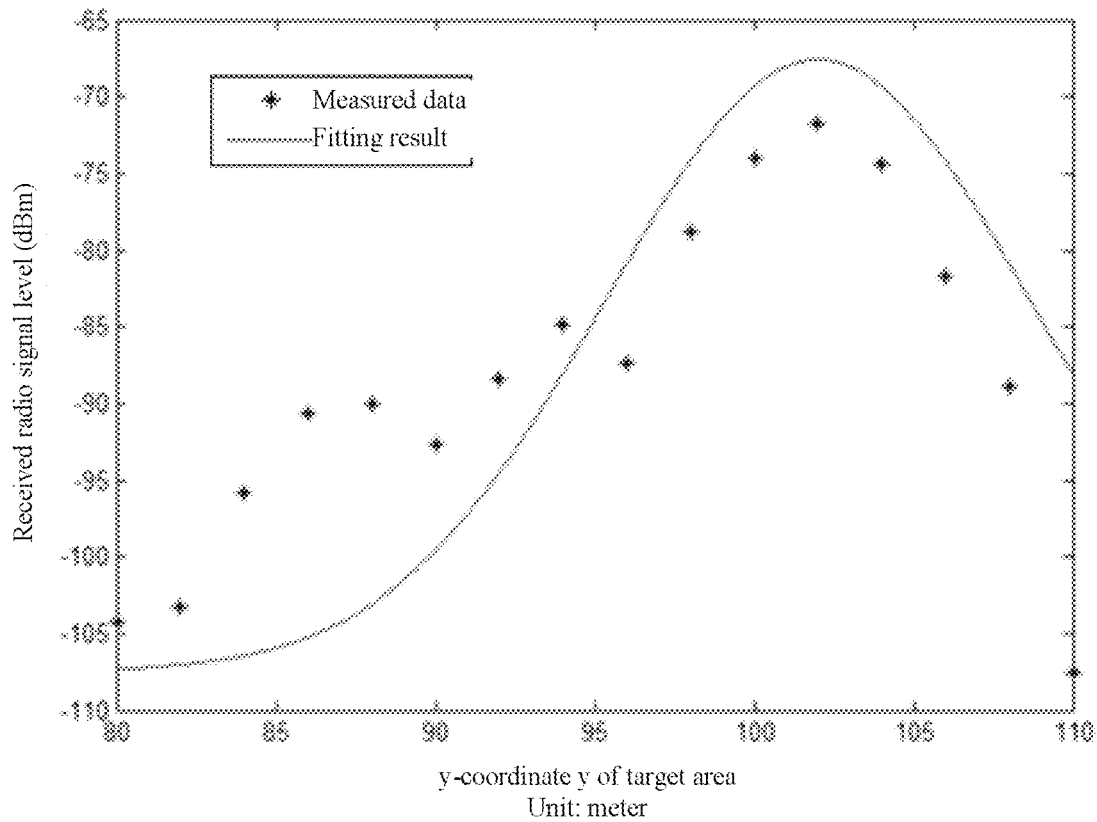
FIG. 16 is a schematic diagram (II) of radio signal quality in a y-axis direction and one-dimensional Gaussian curve fitting in another embodiment of the present disclosure.

At operation 7, an x-coordinate and a y-coordinate of the receiving device are estimated separately through a dimension reduction method, where estimation results are shown in FIG. 15 and FIG. 16 respectively.

At operation 8, positioning results and errors are determined.

One-dimensional Gaussian functions are selected as fitting curves, and for an x direction and a y direction, parameters of the one-dimensional Gaussian functions in the x direction and the y direction are determined respectively through least square fitting, where an x-coordinate corresponding to a vertex of a Gaussian curve in the x direction is an x-coordinate (that is, xt) of a positioning result, and a y-coordinate corresponding to a vertex of a Gaussian curve in the y direction is a y-coordinate (that is, yt) of the positioning result, and fitting results may be seen from FIGS. 15 and 16 respectively.

The positioning result obtained in the embodiment of the present disclosure is as follows: [63.8170, 100.6145] m, and a positioning error between same and real position coordinates of the receiving device as a reference is: 1.3975 m.

Through the descriptions in the above embodiments, those having ordinary skill in the art would clearly know that the methods according to the above embodiments may be achieved by means of software plus a necessary general-purpose hardware platform, and certainly may also be achieved by means of hardware, but in many situations the former is a better implementation. Based on the understanding, the technical solution provided in the present disclosure may be embodied in a form of a software product in essence or a part contributing to the prior art, and the computer software product is stored in a storage medium (for example, read-only memory (ROM)/random access memory (RAM), a magnetic disk and an optical disk), and includes several instructions for enabling a terminal device (which may be a mobile phone, a computer, a server or a network device, etc.) to execute the methods in all the embodiments of the present disclosure.

An embodiment of the present disclosure provides a positioning device for a receiving device, the device is used for achieving the above embodiments and the exemplary implementations, and the illustrated content will not be repeated. The term "module", as used below, may achieve a combination of software and/or hardware with predetermined functions. While the device described in the following embodiments is preferably achieved in software, achievement of hardware, or a combination of software and hardware, are also possible and conceivable.

Figure 17:
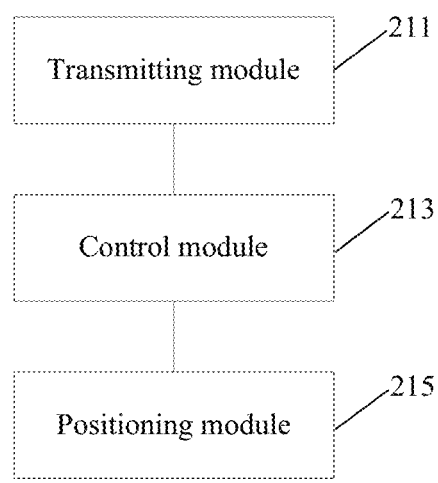
FIG. 17 is a structural block diagram of a positioning device for a receiving device in an embodiment of the present disclosure.

FIG. 17 is a structural block diagram of a positioning device for a receiving device in an embodiment of the present disclosure. As shown in FIG. 17, the positioning device includes:

a transmitting module 211, configured to transmit, through a transmitting device, a pilot signal to an electromagnetic reflecting surface;

a control module 213, configured to transmit, through the transmitting device, control information to an electromagnetic reflecting surface control unit, where the control information includes temporal information and control direction information, the control information is used for instructing the electromagnetic reflecting surface control unit to orient, in target time periods, reflected beams formed by target pilot signals on the electromagnetic reflecting surface towards preset directions, the preset directions are directions indicated by multiple pieces of preset direction information corresponding to respective ones of the target time periods, the preset directions point to a target area, the temporal information includes the target time periods, the control direction information includes the preset direction information, and the pilot signal transmitted by the transmitting device includes the target pilot signals; and a positioning module 215, configured to determine, through the transmitting device or the receiving device, signal measurement results corresponding to the preset directions, and position, through the transmitting device or the receiving device, the receiving device according to the preset directions and the signal measurement results, where the signal measurement results are the ones obtained by measuring, by the receiving device located in the target area, the received target pilot signals reflected in the preset directions.

Through the embodiment of the present disclosure, the transmitting device transmits the pilot signal to the electromagnetic reflecting surface; the transmitting device transmits the control information to the electromagnetic reflecting surface control unit, where the control information includes the temporal information and the control direction information, the control information is used for instructing the electromagnetic reflecting surface control unit to orient, in the target time periods, the reflected beams formed by the target pilot signals on the electromagnetic reflecting surface towards the preset directions, the preset directions are the directions indicated by multiple pieces of preset direction information corresponding to the respective ones of target time periods, the preset directions point to the target area, the temporal information includes the target time periods, the control direction information includes the preset direction information, and the pilot signal transmitted by the transmitting device includes the target pilot signals; and the transmitting device or the receiving device determines the signal measurement results corresponding to the preset directions, and positions the receiving device according to the preset directions and the signal measurement results, where the signal measurement results are the results obtained by measuring, by the receiving device located in the target area, the received target pilot signals reflected in the preset directions. Therefore, the technical problem that in the related art, a terminal may not be positioned by means of characteristics of an electromagnetic reflecting surface may be solved, and the effect of positioning a terminal by means of characteristics of an electromagnetic reflecting surface is achieved.

In an exemplary embodiment, the device further includes: a first determination module, configured to determine, through the transmitting device, the control information according to the target area. The first determination module is further configured to determine the multiple pieces of preset direction information according to multiple sub-areas obtained by dividing the target area, and determine the multiple target time periods according to the multiple pieces of preset direction information, where the multiple pieces of preset direction information are in one-to-one correspondence with the multiple sub-areas, the temporal information includes the multiple target time periods, and the multiple target time periods are in one-to-one correspondence with the multiple pieces of preset direction information; or determine multiple preset directions pointing to the target area, determine each piece of preset direction information as one of the multiple preset directions, and determine the multiple target time periods according to the multiple pieces of preset direction information, where the temporal information includes the multiple target time periods, and the multiple target time periods are in one-to-one correspondence with the multiple pieces of preset direction information.

In an exemplary embodiment, the device further includes an adjustment module, configured to determine, through the electromagnetic reflecting surface control unit, target reflection coefficients according to the preset direction information; and adjust, through the electromagnetic reflecting surface control unit, reflection coefficients of respective electromagnetic units of the electromagnetic reflecting surface to the target reflection coefficients, so as to form the reflected beams in the preset directions by the electromagnetic reflecting surface. The reflection coefficient of each electromagnetic unit includes at least one of amplitude, phase and polarization.

In an exemplary embodiment, the device further includes an adjustment module, configured to adjust, through the electromagnetic reflecting surface control unit in a case where the multiple pieces of preset direction information are respectively target reflection coefficients, corresponding to the preset directions, of respective electromagnetic units, reflection coefficients of respective electromagnetic units of the electromagnetic reflecting surface to the target reflection coefficients, so as to form the reflected beams in the preset directions by the electromagnetic reflecting surface. The reflection coefficient of each electromagnetic unit includes at least one of amplitude, phase and polarization.

In an exemplary embodiment, the device further includes an adjustment module, configured to determine, through the electromagnetic reflecting surface control unit in a case where the multiple pieces of preset direction information are respectively input parameters corresponding to the preset directions, target reflection coefficients according to the input parameters, and adjust, through the electromagnetic reflecting surface control unit, reflection coefficients of respective electromagnetic units of the electromagnetic reflecting surface to the target reflection coefficients, so as to form the reflected beams in the preset directions by the electromagnetic reflecting surface. The input parameters are used for determining the target reflection coefficients, and the reflection coefficient of each electromagnetic unit includes at least one of amplitude, phase and polarization.

In an exemplary embodiment, the control information further includes one of: beam control start time for instructing the electromagnetic reflecting surface control unit to start controlling respective electromagnetic units of the electromagnetic reflecting surface at the beam control start time, so as to control directions of the reflected beams on the electromagnetic reflecting surface; or beam control end time for instructing the electromagnetic reflecting surface control unit to end up controlling respective electromagnetic units of the electromagnetic reflecting surface at the beam control end time.

In an exemplary embodiment, in a case of determining, through the transmitting device, the signal measurement results corresponding to the preset directions, and positioning, through the transmitting device, the receiving device according to the preset directions and the signal measurement results, the positioning module 215 is further configured to receive, through the transmitting device, a measurement result set transmitted by the receiving device. The measurement result set includes the signal measurement results corresponding to the target time periods. The operation of determining signal measurement results corresponding to the preset directions by the transmitting device includes: determine, according to the target time periods, the preset directions indicated by the multiple pieces of preset direction information corresponding to the respective ones of target time periods, and determine the signal measurement results corresponding to the target time periods as the signal measurement results corresponding to the preset directions.

In an exemplary embodiment, in a case of determining, through the receiving device, the signal measurement results corresponding to the preset directions, and positioning, through the receiving device, the receiving device according to the preset directions and the signal measurement results, before determining, through the receiving device, the signal measurement results corresponding to the preset directions, the positioning module 215 is further configured to receive, through the receiving device, corresponding relation information transmitted by the transmitting device. The corresponding relation information indicates a corresponding relation between the preset directions and the target time periods, or the corresponding relation information indicates a corresponding relation between the preset directions and the target pilot signals. The operation of determining signal measurement results corresponding to the preset directions by the receiving device includes: determine, in a case where the corresponding relation information indicates the corresponding relation between the preset directions and the target time periods, signal measurement results corresponding to the target time periods as the signal measurement results corresponding to the preset directions; or determine, in a case where the corresponding relation information indicates the corresponding relation between the preset directions and the target pilot signals, signal measurement results corresponding to the target pilot signals as the signal measurement results corresponding to the preset directions.

In an exemplary embodiment, the positioning module 215 is further configured to determine, according to the preset directions and a position and height of the electromagnetic reflecting surface, position coordinates (xi, yi) of the reflected beam corresponding to each preset direction in the target area, and determine a value of the signal measurement result corresponding to the preset direction as a z-coordinate zi corresponding to the position coordinates (xi, yi), where i is an identifier of the reflected beam corresponding to the preset direction; and carry out Gaussian function fitting according to a coordinate range of the target area, the position coordinates (xi, yi) and the corresponding z-coordinate zi to obtain a fitted Gaussian function, and determine, according to coordinates corresponding to a vertex of the fitted Gaussian function, a positioning result of positioning the receiving device.

In an exemplary embodiment, the positioning module 215 is further configured to sample, at a preset coordinate interval, an x-coordinate range and a y-coordinate range of the target area respectively to obtain an x-coordinate set and a y-coordinate set after sampling; determine a z-coordinate zw corresponding to each x-coordinate xw in the x-coordinate set from the z-coordinate zi corresponding to the position coordinates (xi, yi), and determine a z-coordinate zp corresponding to each y-coordinate yp in the y-coordinate set from the z-coordinate zi corresponding to the position coordinates (xi, yi), where w and p are positive integers in an interval [1,n], and n is the number of samples sampled; carry out one-dimensional Gaussian function fitting according to a coordinate set (xw, zw) composed of the x-coordinate set and the z-coordinate zw corresponding to each x-coordinate xw in the x-coordinate set to obtain a first fitted Gaussian function; carry out one-dimensional Gaussian curve fitting according to a coordinate set (yp, zp) composed of the y-coordinate set and the z-coordinate zp corresponding to each y-coordinate yp in the y-coordinate set to obtain a second fitted Gaussian function; and determine a first coordinate xt corresponding to a vertex of the first Gaussian function and a second coordinate yt corresponding to a vertex of the second Gaussian function, and determine xt and yt as an x-coordinate and a y-coordinate of the positioning result respectively, where the xt is an x-coordinate within the x-coordinate range, and the yt is a y-coordinate within the y-coordinate range.

In an exemplary embodiment, the positioning module 215 is further configured to determine, according to the preset directions and a position and height of the electromagnetic reflecting surface, position coordinates (xi, yi) of the reflected beam corresponding to each preset direction in the target area, and determine a value of the signal measurement result corresponding to the preset direction as a z-coordinate zi corresponding to the position coordinates (xi, yi), where i is an identifier of the reflected beam corresponding to the preset direction; carry out two-dimensional Gaussian function fitting according to a coordinate set (xi, yi, zi) composed of the position coordinates (xi, yi) and the z-coordinate zi to obtain a fitted two-dimensional Gaussian function; and determine coordinates (xt, yt) corresponding to a vertex of the two-dimensional Gaussian function, and determining the coordinates (xt, yt) as a positioning result of positioning the receiving device, where xt is an x-coordinate within an x-coordinate range of the target area, and yt is a y-coordinate within a y-coordinate range of the target area.

In an exemplary embodiment, the device further includes a second determination module, configured to determine, through the transmitting device, target direction information according to a positioning result of positioning the receiving device after determining, through the transmitting device, the signal measurement results corresponding to the preset directions, and positioning, through the transmitting device, the receiving device according to the preset directions and the signal measurement results. The target direction information is used for instructing the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals transmitted by the transmitting device towards the receiving device.

In an exemplary embodiment, the device further includes a second determination module, configured to determine, through the receiving device, target direction information according to a positioning result of positioning the receiving device after determining, through the receiving device, signal measurement results corresponding to the preset directions, and positioning, through the receiving device, the receiving device according to the preset directions and the signal measurement results. The target direction information is used for instructing the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals transmitted by the transmitting device towards the receiving device.

An embodiment of the present disclosure provides a positioning system for a receiving device, the system is used for achieving the above embodiments and the exemplary implementations, and the illustrated content will not be repeated. The system includes: a transmitting device, an electromagnetic reflecting surface control unit, an electromagnetic reflecting surface and a receiving device. The transmitting device is configured to transmit a pilot signal to the electromagnetic reflecting surface and is configured to transmit control information to the electromagnetic reflecting surface control unit. The control information includes temporal information and control direction information, the control information is used for instructing the electromagnetic reflecting surface control unit to orient, in target time periods, reflected beams formed by target pilot signals on the electromagnetic reflecting surface towards preset directions, the preset directions are directions indicated by multiple pieces of preset direction information corresponding to respective ones of the target time periods, and the preset directions point to a target area. The temporal information includes the target time periods, the control direction information includes the preset direction information, and the pilot signal transmitted by the transmitting device includes the target pilot signals. The electromagnetic reflecting surface control unit is configured to orient, in the target time periods according to the control information, the reflected beams formed by the target pilot signals on the electromagnetic reflecting surface towards the preset directions. The receiving device is configured to measure the received target pilot signals reflected in the preset directions to obtain signal measurement results. The receiving device is located in the target area. The transmitting device or the receiving device is further configured to determine the signal measurement results corresponding to the preset directions, and position the receiving device according to the preset directions and the signal measurement results corresponding to the preset directions.

Through the embodiment of the present disclosure, the transmitting device transmits the pilot signal to the electromagnetic reflecting surface; the transmitting device transmits the control information to the electromagnetic reflecting surface control unit, where the control information includes the temporal information and the control direction information, the control information is used for instructing the electromagnetic reflecting surface control unit to orient, in the target time periods, the reflected beams formed by the target pilot signals on the electromagnetic reflecting surface towards the preset directions, the preset directions are the directions indicated by multiple pieces of preset direction information corresponding to the respective ones of target time periods, the preset directions point to the target area, the temporal information includes the target time periods, the control direction information includes the preset direction information, and the pilot signal transmitted by the transmitting device includes the target pilot signals; and the transmitting device or the receiving device determines the signal measurement results corresponding to the preset directions, and positions the receiving device according to the preset directions and the signal measurement results, where the signal measurement results are the results obtained by measuring, by the receiving device located in the target area, the received target pilot signals reflected in the preset directions. Therefore, the technical problem that in the related art, a terminal may not be positioned by means of characteristics of an electromagnetic reflecting surface may be solved, and the effect of positioning a terminal by means of characteristics of an electromagnetic reflecting surface is achieved.

In an exemplary embodiment, the transmitting device is further configured to determine the control information according to the target area, specifically, the transmitting device is further configured to determine the control information according to the target area through the following method including: determine the multiple pieces of preset direction information according to multiple sub-areas obtained by dividing the target area, and determine the multiple target time periods according to the multiple pieces of preset direction information, where the multiple pieces of preset direction information are in one-to-one correspondence with the multiple sub-areas, the temporal information includes the multiple target time periods, and the multiple target time periods are in one-to-one correspondence with the multiple pieces of preset direction information; or determine multiple preset directions configured to point to the target area, determine each piece of preset direction information as one of the multiple preset directions, and determine the multiple target time periods according to the multiple pieces of preset direction information, where the temporal information includes the multiple target time periods, and the multiple target time periods are in one-to-one correspondence with the multiple pieces of preset direction information.

In an exemplary embodiment, the electromagnetic reflecting surface control unit is further configured to determine target reflection coefficients according to the preset direction information; and adjust reflection coefficients of respective electromagnetic units of the electromagnetic reflecting surface to the target reflection coefficients by the electromagnetic reflecting surface control unit, so as to form the reflected beams in the preset directions by the electromagnetic reflecting surface. The reflection coefficient of each electromagnetic unit includes at least one of amplitude, phase and polarization.

In an exemplary embodiment, the electromagnetic reflecting surface control unit is further configured to adjust, in a case where the multiple pieces of preset direction information are respectively target reflection coefficients, corresponding to the preset directions, of respective electromagnetic units, reflection coefficients of respective electromagnetic units of the electromagnetic reflecting surface to the target reflection coefficients, so as to form the reflected beams in the preset directions by the electromagnetic reflecting surface. The reflection coefficient of each electromagnetic unit includes at least one of amplitude, phase and polarization.

In an exemplary embodiment, the electromagnetic reflecting surface control unit is further configured to determine, in a case where the multiple pieces of preset direction information are respectively input parameters corresponding to the preset directions, target reflection coefficients according to the input parameters, and adjust reflection coefficients of respective electromagnetic units of the electromagnetic reflecting surface to the target reflection coefficients, so as to form the reflected beams in the preset directions by the electromagnetic reflecting surface. The input parameters are used for determining the target reflection coefficients, and the reflection coefficient of each electromagnetic unit includes at least one of amplitude, phase and polarization.

In an exemplary embodiment, the control information further includes one of: beam control start time for instructing the electromagnetic reflecting surface control unit to start controlling respective electromagnetic units of the electromagnetic reflecting surface at the beam control start time, so as to control directions of the reflected beams on the electromagnetic reflecting surface; or beam control end time for instructing the electromagnetic reflecting surface control unit to end up controlling respective electromagnetic units of the electromagnetic reflecting surface at the beam control end time.

In an exemplary embodiment, the transmitting device is further configured to receive a measurement result set transmitted by the receiving device. The measurement result set includes the signal measurement results corresponding to the target time periods. The transmitting device is further configured to determine, according to the target time periods, the preset directions indicated by the multiple pieces of preset direction information corresponding to the respective ones of target time periods, and determine the signal measurement results corresponding to the target time periods as the signal measurement results corresponding to the preset directions.

In an exemplary embodiment, the receiving device is further configured to receive corresponding relation information transmitted by the transmitting device. The corresponding relation information indicates a corresponding relation between the preset directions and the target time periods, or the corresponding relation information indicates a corresponding relation between the preset directions and the target pilot signals. The receiving device is further configured to determine, in a case where the corresponding relation information indicates the corresponding relation between the preset directions and the target time periods, signal measurement results corresponding to the target time periods as the signal measurement results corresponding to the preset directions; or determine, in a case where the corresponding relation information indicates the corresponding relation between the preset directions and the target pilot signals, signal measurement results corresponding to the target pilot signals as the signal measurement results corresponding to the preset directions.

In an exemplary embodiment, the transmitting device or the receiving device is further configured to determine, according to the preset directions and a position and height of the electromagnetic reflecting surface, position coordinates (xi, yi) of the reflected beam corresponding to each preset direction in the target area, and determine a value of the signal measurement result corresponding to the preset direction as a z-coordinate zi corresponding to the position coordinates (xi, yi), where i is an identifier of the reflected beam corresponding to the preset direction; and carry out Gaussian function fitting according to a coordinate range of the target area, the position coordinates (xi, yi) and the corresponding z-coordinate zi to obtain a fitted Gaussian function, and determine, according to coordinates corresponding to a vertex of the fitted Gaussian function, a positioning result of positioning the receiving device.

In an exemplary embodiment, the operation of carrying out Gaussian function fitting according to a coordinate range of the target area, the position coordinates (xi, yi) and the corresponding z-coordinate zi to obtain a fitted Gaussian function, and determining, according to the coordinates corresponding to the vertex of the fitted Gaussian function, the positioning result of positioning the receiving device include: sampling, at a preset coordinate interval, an x-coordinate range and a y-coordinate range of the target area respectively to obtain an x-coordinate set and a y-coordinate set after sampling; determining a z-coordinate zw corresponding to each x-coordinate xw in the x-coordinate set from the z-coordinate zi corresponding to the position coordinates (xi, yi), and determine a z-coordinate zp corresponding to each y-coordinate yp in the y-coordinate set from the z-coordinate zi corresponding to the position coordinates (xi, yi), where w and p are positive integers in an interval [1,n], and n is the number of samples sampled; carry out one-dimensional Gaussian function fitting according to a coordinate set (xw, zw) composed of the x-coordinate set and the z-coordinate zw corresponding to each x-coordinate xw in the x-coordinate set to obtain a first fitted Gaussian function; carrying out one-dimensional Gaussian curve fitting according to a coordinate set (yp, zp) composed of the y-coordinate set and the z-coordinate zp corresponding to each y-coordinate yp in the y-coordinate set to obtain a second fitted Gaussian function; and determining a first coordinate xt corresponding to a vertex of the first Gaussian function and a second coordinate yt corresponding to a vertex of the second Gaussian function, and determining xt and yt as an x-coordinate and a y-coordinate of the positioning result respectively, where the xt is an x-coordinate within the x-coordinate range, and the yt is a y-coordinate within the y-coordinate range.

In an exemplary embodiment, the transmitting device or the receiving device is further configured to determine, according to the preset directions and a position and height of the electromagnetic reflecting surface, position coordinates (xi, yi) of the reflected beam corresponding to each preset direction in the target area, and determine a value of the signal measurement result corresponding to the preset direction as a z-coordinate zi corresponding to the position coordinates (xi, yi), where i is an identifier of the reflected beam corresponding to the preset direction; carry out two-dimensional Gaussian function fitting according to a coordinate set (xi, yi, zi) composed of the position coordinates (xi, yi) and the z-coordinate zi to obtain a fitted two-dimensional Gaussian function; and determine coordinates (xt, yt) corresponding to a vertex of the two-dimensional Gaussian function, and determining the coordinates (xt, yt) as a positioning result of positioning the receiving device, where xt is an x-coordinate within an x-coordinate range of the target area, and yt is a y-coordinate within a y-coordinate range of the target area.

In an exemplary embodiment, in a case where the transmitting device is configured to determine signal measurement results corresponding to the preset directions, and position the receiving device according to the preset directions and the signal measurement results, the transmitting device is configured to determine target direction information according to a positioning result of positioning the receiving device. The target direction information is used for instructing the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals transmitted by the transmitting device towards the receiving device.

In an exemplary embodiment, in a case where the receiving device is configured to determine signal measurement results corresponding to the preset directions, and position the receiving device according to the preset directions and the signal measurement results, the receiving device is further configured to determine target direction information according to a positioning result of positioning the receiving device. The target direction information is used for instructing the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals transmitted by the transmitting device towards the receiving device.

It should be noted that the above various modules may be implemented in software or hardware. The above modules may be implemented in hardware in such a way that the modules are positioned in the same processor or in different processors respectively in any combination form, but are not limited to the way.

An embodiment of the present disclosure provides a computer-readable storage medium storing a computer program, and this computer program is configured to execute the operations in any one of the above method embodiments.

In an exemplary embodiment, the above computer-readable storage medium may include, but is not limited to, a universal serial bus flash disk, a read-only memory (ROM), a random access memory (RAM), a removable hard disk, a magnetic disk, or an optical disk, and other various media that may store computer programs.

An embodiment of the present disclosure provides an electronic device including a memory and a processor, the memory stores a computer program, and the processor is configured to run the computer program so as to execute the operations in any one of the above method embodiments.

In an exemplary embodiment, the electronic device may further include a transceiver device and an input/output device, the transceiver device is connected with the processor above, and the input/output device is connected with the above processor.

For specific examples in the embodiment, reference may be made to examples described in the above embodiments and exemplary implementations, which will not be repeated herein.

Obviously, those having ordinary skill in the art should understand that all the above modules or operations in the present disclosure may be implemented with a general-purpose computation device, and may be centralized on a single computation device or distributed on a network composed of multiple computation devices. The modules or operations may also be implemented with program codes executable by the computation device, such that they may be stored in a storage device to be executed by the computation device. Under some situations, the operations shown or described may be executed in an order different from that herein. Or, the modules or operations may be fabricated separately as individual integrated circuit modules, or multiple modules or operations the modules or operations may be fabricated as a single integrated circuit module for implementation. Thus, the present disclosure is not limited to any particular combination of hardware and software.

The foregoing is merely the exemplary embodiments of the present disclosure and is not intended to limit the present disclosure, and various changes and modifications may be made by those having ordinary skill in the art. Any modifications, equivalent substitutions, improvements, etc. within the principles of the present disclosure are intended to fall within the scope of protection of the present disclosure.

What is claimed is:

1. A positioning method for a receiving device, comprising:
    transmitting, by a transmitting device, a pilot signal to an electromagnetic reflecting surface;
    transmitting, by the transmitting device, control information to an electromagnetic reflecting surface control unit, wherein the control information comprises temporal information and control direction information, the control information is used for instructing the electromagnetic reflecting surface control unit to orient, in target time periods, reflected beams formed by target pilot signals on the electromagnetic reflecting surface towards preset directions, the preset directions are directions indicated by multiple pieces of preset direction information corresponding to respective ones of the target time periods, the preset directions point to a target area, the temporal information comprises the target time periods, the control direction information comprises the preset direction information, and the pilot signal transmitted by the transmitting device comprises the target pilot signals; and
    determining, by the transmitting device or the receiving device, signal measurement results corresponding to the preset directions, and positioning, by the transmitting device or the receiving device, the receiving device according to the preset directions and the signal measurement results, wherein the signal measurement results are the ones obtained by measuring, by the receiving device located in the target area, the received target pilot signals reflected in the preset directions.

2. The method according to claim 1, wherein
before transmitting, by the transmitting device, the pilot signal to the electromagnetic reflecting surface, the method further comprises: determining, by the transmitting device, the control information according to the target area; and
determining the control information according to the target area comprises: determining the multiple pieces of preset direction information according to multiple sub-areas obtained by dividing the target area, and determining the temporal information according to the multiple pieces of preset direction information, wherein the multiple pieces of preset direction information are in one-to-one correspondence with the multiple sub-areas, the temporal information comprises the multiple target time periods, and the multiple target time periods are in one-to-one correspondence with the multiple pieces of preset direction information; or determining multiple preset directions pointing to the target area, determining each piece of preset direction information as one of the multiple preset directions, and determining the temporal information according to the multiple pieces of preset direction information, wherein the temporal information comprises the multiple target time periods, and the multiple target time periods are in one-to-one correspondence with the multiple pieces of preset direction information.

3. The method according to claim 2, wherein determining the multiple pieces of preset direction information according to multiple sub-areas obtained by dividing the target area comprises:
    determining, by the transmitting device, the multiple pieces of preset direction information corresponding to the respective sub-areas according to a scanning sequence of the sub-areas of the target area.

4. The method according to claim 1, wherein after transmitting, by the transmitting device, the control information to the electromagnetic reflecting surface control unit, the method further comprises:
    determining, by the electromagnetic reflecting surface control unit, target reflection coefficients according to the multiple pieces of preset direction information; and
    adjusting, by the electromagnetic reflecting surface control unit, reflection coefficients of respective electromagnetic units of the electromagnetic reflecting surface to the target reflection coefficients, so as to form the reflected beams in the preset directions by the electromagnetic reflecting surface, wherein the reflection coefficient of each electromagnetic unit comprises at least one of amplitude, phase and polarization.

5. The method according to claim 1, wherein in a case where the multiple pieces of preset direction information are respectively target reflection coefficients, corresponding to the preset directions, of respective electromagnetic units, after transmitting, by the transmitting device, the control information to the electromagnetic reflecting surface control unit, the method further comprises:
  adjusting, by the electromagnetic reflecting surface control unit, reflection coefficients of respective electromagnetic units of the electromagnetic reflecting surface to the target reflection coefficients, so as to form the reflected beams in the preset directions by the electromagnetic reflecting surface, wherein the reflection coefficient of each electromagnetic unit comprises at least one of amplitude, phase and polarization.

6. The method according to claim 1, wherein in a case where the multiple pieces of preset direction information are respectively input parameters corresponding to the preset directions, after transmitting, by the transmitting device, the control information to the electromagnetic reflecting surface control unit, the method further comprises:
  determining, by the electromagnetic reflecting surface control unit, target reflection coefficients according to the input parameters, and adjusting, by the electromagnetic reflecting surface control unit, reflection coefficients of respective electromagnetic units of the electromagnetic reflecting surface to the target reflection coefficients, so as to form the reflected beams in the preset directions by the electromagnetic reflecting surface, wherein the input parameters are used for determining the target reflection coefficients, and the reflection coefficient of each electromagnetic unit comprises at least one of amplitude, phase and polarization.

7. The method according to claim 1, wherein the control information further comprises one of:
  beam control start time for instructing the electromagnetic reflecting surface control unit to start controlling respective electromagnetic units of the electromagnetic reflecting surface at the beam control start time, so as to control directions of the reflected beams on the electromagnetic reflecting surface; or
  beam control end time for instructing the electromagnetic reflecting surface control unit to end up controlling respective electromagnetic units of the electromagnetic reflecting surface at the beam control end time.

8. The method according to claim 1, wherein in a case of determining, by the transmitting device, the signal measurement results corresponding to the preset directions, and positioning, by the transmitting device, the receiving device according to the preset directions and the signal measurement results, before determining, by the transmitting device, the signal measurement results corresponding to the preset directions, the method further comprises:
  receiving, by the transmitting device, a measurement result set transmitted by the receiving device, wherein the measurement result set comprises the signal measurement results corresponding to the target time periods; and
  determining, by the transmitting device, the signal measurement results corresponding to the preset directions comprises:
    determining, according to the target time periods, the preset directions indicated by the multiple pieces of preset direction information corresponding to the respective ones of target time periods, and determining the signal measurement results corresponding to the target time periods as the signal measurement results corresponding to the preset directions.

9. The method according to claim 1, wherein in a case of determining, by the receiving device, the signal measurement results corresponding to the preset directions, and positioning, by the receiving device, the receiving device according to the preset directions and the signal measurement results, before determining, by the receiving device, the signal measurement results corresponding to the preset directions, the method further comprises:
  receiving, by the receiving device, corresponding relation information transmitted by the transmitting device, wherein the corresponding relation information indicates a corresponding relation between the preset directions and the target time periods, or the corresponding relation information indicates a corresponding relation between the preset directions and the target pilot signals; and
  determining, by the receiving device, the signal measurement results corresponding to the preset directions comprises: determining, in a case where the corresponding relation information indicates the corresponding relation between the preset directions and the target time periods, signal measurement results corresponding to the target time periods as the signal measurement results corresponding to the preset directions; or determining, in a case where the corresponding relation information indicates the corresponding relation between the preset directions and the target pilot signals, signal measurement results corresponding to the target pilot signals as the signal measurement results corresponding to the preset directions.

10. The method according to claim 1, wherein positioning the receiving device according to the preset directions and the signal measurement results comprises:
  determining, according to the preset directions and a position and height of the electromagnetic reflecting surface, position coordinates $(x_i, y_i)$ of the reflected beam corresponding to each preset direction in the target area, and determining a value of the signal measurement result corresponding to the preset direction as a z-coordinate $z_i$ corresponding to the position coordinates $(x_i, y_i)$, wherein i is an identifier of the reflected beam corresponding to the preset direction; and
  carrying out Gaussian function fitting according to a coordinate range of the target area, the position coordinates $(x_i, y_i)$ and the corresponding z-coordinate $z_i$ to obtain a fitted Gaussian function, and determining, according to coordinates corresponding to a vertex of the fitted Gaussian function, a positioning result of positioning the receiving device.

11. The method according to claim 10, wherein carrying out Gaussian function fitting according to the coordinate range of the target area, the position coordinates $(x_i, y_i)$ and the corresponding z-coordinate $z_i$ to obtain the fitted Gaussian function, and determining, according to the coordinates corresponding to the vertex of the fitted Gaussian function, the positioning result of positioning the receiving device comprise:
  sampling, at a preset coordinate interval, an x-coordinate range and a y-coordinate range of the target area respectively to obtain an x-coordinate set and a y-coordinate set after sampling;
  determining a z-coordinate $z_w$ corresponding to each x-coordinate $x_w$ in the x-coordinate set from the z-coordinate $z_i$ corresponding to the position coordinates (xi, yi), and determining a z-coordinate zp corresponding to each y-coordinate yp in the y-coordinate set from the z-coordinate zi corresponding to the position coordinates (xi, yi), wherein w and p are positive integers in an interval [1,n], and n is the number of samples sampled;

carrying out one-dimensional Gaussian function fitting according to a coordinate set (xw, zw) composed of the x-coordinate set and the z-coordinate zw corresponding to each x-coordinate xw in the x-coordinate set to obtain a first fitted Gaussian function; carrying out one-dimensional Gaussian curve fitting according to a coordinate set (yp, zp) composed of the y-coordinate set and the z-coordinate zp corresponding to each y-coordinate yp in the y-coordinate set to obtain a second fitted Gaussian function; and determining a first coordinate xt corresponding to a vertex of the first Gaussian function and a second coordinate yt corresponding to a vertex of the second Gaussian function, and determining xt and yt as an x-coordinate and a y-coordinate of the positioning result respectively, wherein xt is an x-coordinate within the x-coordinate range, and yt is a y-coordinate within the y-coordinate range.

12. The method according to claim 1, wherein positioning the receiving device according to the preset directions and the signal measurement results comprises:

determining, according to the preset directions and a position and height of the electromagnetic reflecting surface, position coordinates (xi, yi) of the reflected beam corresponding to each preset direction in the target area, and determining a value of the signal measurement result corresponding to the preset direction as a z-coordinate zi corresponding to the position coordinates (xi, yi), wherein i is an identifier of the reflected beam corresponding to the preset direction;

carrying out two-dimensional Gaussian function fitting according to a coordinate set (xi, yi, zi) composed of the position coordinates (xi, yi) and the z-coordinate zi to obtain a fitted two-dimensional Gaussian function; and determining coordinates (xt, yt) corresponding to a vertex of the two-dimensional Gaussian function, and determining the coordinates (xt, yt) as a positioning result of positioning the receiving device, wherein xt is an x-coordinate within an x-coordinate range of the target area, and yt is a y-coordinate within a y-coordinate range of the target area.

13. The method according to claim 1, wherein after determining, by the transmitting device, the signal measurement results corresponding to the preset directions, and positioning, by the transmitting device, the receiving device according to the preset directions and the signal measurement results, the method further comprises:

determining, by the transmitting device, target direction information according to a positioning result of positioning the receiving device, wherein the target direction information is used for instructing the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals transmitted by the transmitting device towards the receiving device.

14. The method according to claim 1, wherein after determining, by the receiving device, the signal measurement results corresponding to the preset directions, and positioning, by the receiving device, the receiving device according to the preset directions and the signal measurement results, the method further comprises:

determining, by the receiving device, target direction information according to a positioning result of positioning the receiving device, wherein the target direction information is used for instructing the electromagnetic reflecting surface control unit to control reflection coefficients of respective electromagnetic units of the electromagnetic reflecting surface according to the target direction information, so as to orient the reflected beams formed on the electromagnetic reflecting surface by radio frequency signals transmitted by the transmitting device towards the receiving device.

15. A non-transitory computer-readable storage medium, storing a computer program, wherein the computer program is configured to execute the method of claim 1 when being executed by a processor.

16. The method according to claim 1, further comprising:
planning and configuring, by the transmitting device, the target pilot signals transmitted by the transmitting device, and notifying, by the transmitting device, the receiving device about the planned target pilot signals.

17. The method according to claim 1, wherein
the target time periods are time periods corresponding to time slot numbers, and the temporal information is a set composed of time periods corresponding to the time slot numbers of multiple time slots sequentially arranged.

18. The method according to claim 1, wherein each signal measurement result is signal quality, signal field strength level or signal receiving power.

19. A positioning device for a receiving device, comprising a memory storing instructions and a processor in communication with the memory, wherein the processor is configured to execute the instructions to:

transmit, through a transmitting device, a pilot signal to an electromagnetic reflecting surface;

transmit, through the transmitting device, control information to an electromagnetic reflecting surface control unit, wherein the control information comprises temporal information and control direction information, the control information is used for instructing the electromagnetic reflecting surface control unit to orient, in target time periods, reflected beams formed by target pilot signals on the electromagnetic reflecting surface towards preset directions, the preset directions are directions indicated by multiple pieces of preset direction information corresponding to respective ones of the target time periods, the preset directions point to a target area, the temporal information comprises the target time periods, the control direction information comprises the preset direction information, and the pilot signal transmitted by the transmitting device comprises the target pilot signals; and determine, through the transmitting device or the receiving device, signal measurement results corresponding to the preset directions, and position, through the transmitting device or the receiving device, the receiving device according to the preset directions and the signal measurement results, wherein the signal measurement results are the ones obtained by measuring, by the receiving device located in the target area, the received target pilot signals reflected in the preset directions.

20. A positioning system for a receiving device, comprising: a transmitting device, an electromagnetic reflecting surface control unit, an electromagnetic reflecting surface and a receiving device, wherein the transmitting device is configured to transmit a pilot signal to the electromagnetic reflecting surface and is configured to transmit control information to the electromagnetic reflecting surface control unit, wherein the control information comprises temporal information and control direction information, the control information is used for instructing the electromagnetic reflecting surface control unit to orient, in target time periods, reflected beams formed by target pilot signals on the electromagnetic reflecting surface towards preset directions, the preset directions are directions indicated by multiple pieces of preset direction information corresponding to respective ones of the target time periods, the preset directions point to a target area, the temporal information comprises the target time periods, the control direction information comprises the preset direction information, and the pilot signal transmitted by the transmitting device comprises the target pilot signals; and the electromagnetic reflecting surface control unit is configured to orient, in the target time periods according to the control information, the reflected beams formed by the target pilot signals on the electromagnetic reflecting surface towards the preset directions;

the receiving device is configured to measure the received target pilot signals reflected in the preset directions to obtain signal measurement results, wherein the receiving device is located in the target area; and the transmitting device or the receiving device is further configured to determine the signal measurement results corresponding to the preset directions, and position the receiving device according to the preset directions and the signal measurement results corresponding to the preset directions.

* * * * *